United States Patent
Yeh et al.

(10) Patent No.: US 9,323,383 B2
(45) Date of Patent: Apr. 26, 2016

(54) METHOD OF IDENTIFYING EDGE SWIPE GESTURE AND METHOD OF OPENING WINDOW CONTROL BAR USING THE IDENTIFYING METHOD

(71) Applicant: ELAN MICROELECTRONICS CORPORATION, Hsin Chu (TW)

(72) Inventors: I-Hau Yeh, Taipei (TW); Yu-Jen Tsai, Taichung (TW)

(73) Assignee: ELAN MICROELECTRONICS CORPORATION, Hsin Chu (TW)

( * ) Notice: Subject to any disclaimer, the term of this patent is extended or adjusted under 35 U.S.C. 154(b) by 0 days.

(21) Appl. No.: 14/215,415

(22) Filed: Mar. 17, 2014

(65) Prior Publication Data

US 2014/0375577 A1      Dec. 25, 2014

(30) Foreign Application Priority Data

Jun. 19, 2013   (TW) .............................. 102121707 A
Jul. 31, 2013    (TW) .............................. 102127431 A

(51) Int. Cl.
*G06F 3/041*   (2006.01)
*G06F 3/044*   (2006.01)

(52) U.S. Cl.
CPC .............. *G06F 3/0416* (2013.01); *G06F 3/044* (2013.01); *G06F 2203/04104* (2013.01); *G06F 2203/04108* (2013.01)

(58) Field of Classification Search
None
See application file for complete search history.

(56) References Cited

U.S. PATENT DOCUMENTS

2011/0209098 A1*   8/2011   Hinckley et al. ............... 715/863
2012/0044199 A1*   2/2012   Karpin et al. ................. 345/174

* cited by examiner

*Primary Examiner* — Joseph Haley
(74) *Attorney, Agent, or Firm* — patenttm.us

(57) ABSTRACT

A method of identifying edge swipe gesture has steps of respectively reading sensing signals on an edge area under a hover mode and on a non-edge area under a touch mode; determining if a touch object has appeared on the edge area after determining that the object has appeared on the non-edge area, calculating a displacement of the object moving from the edge area to the non-edge area within a preset time and determining if the displacement exceeds a preset distance, and determining that the movement of the touch is identified as an edge swipe gesture if the displacement meets the condition. Accordingly, the present invention can perform valid touch on the edge area, rendering effective identification of edge swipe gesture and an increased success rate of the identification.

32 Claims, 22 Drawing Sheets

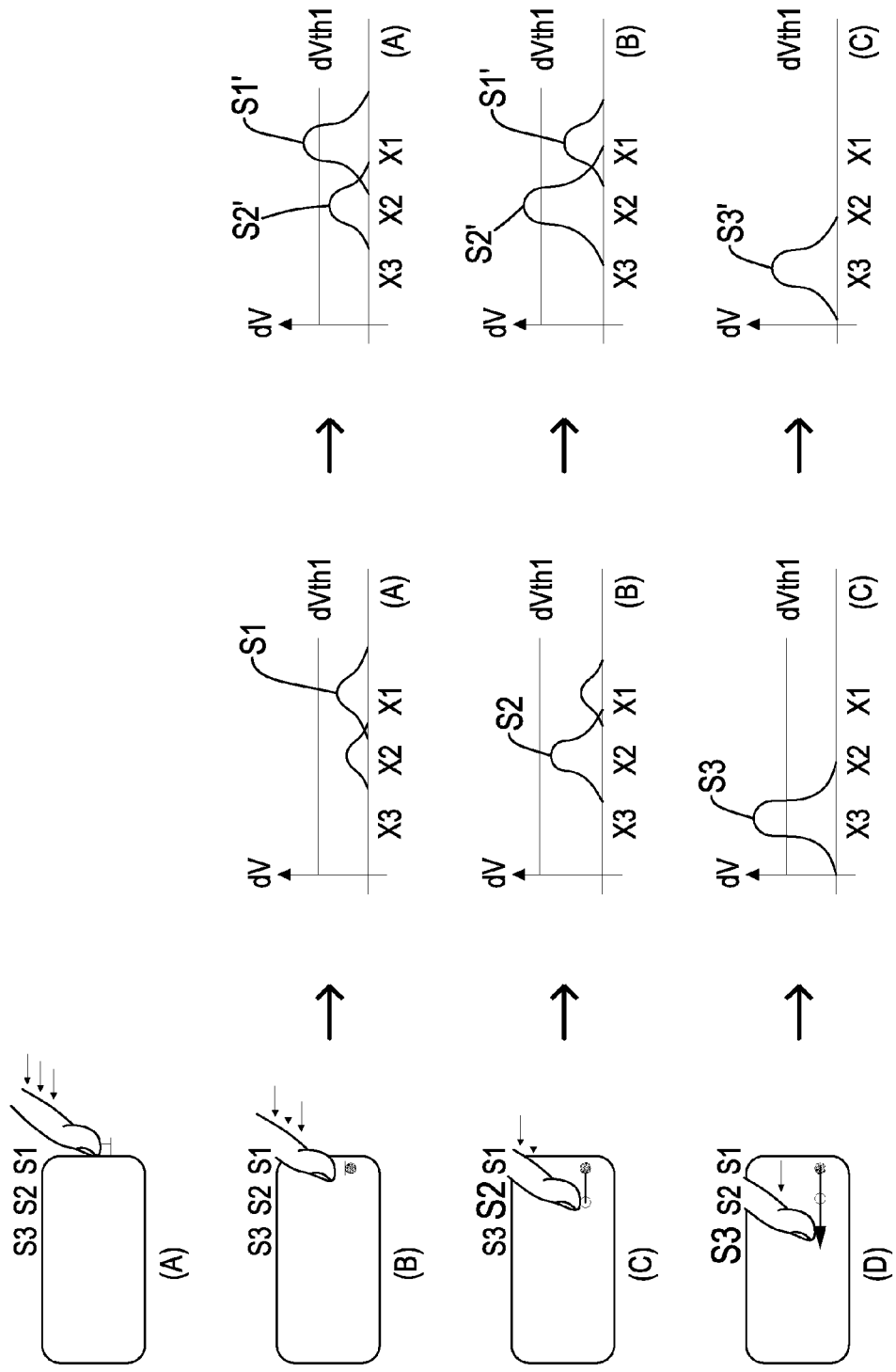

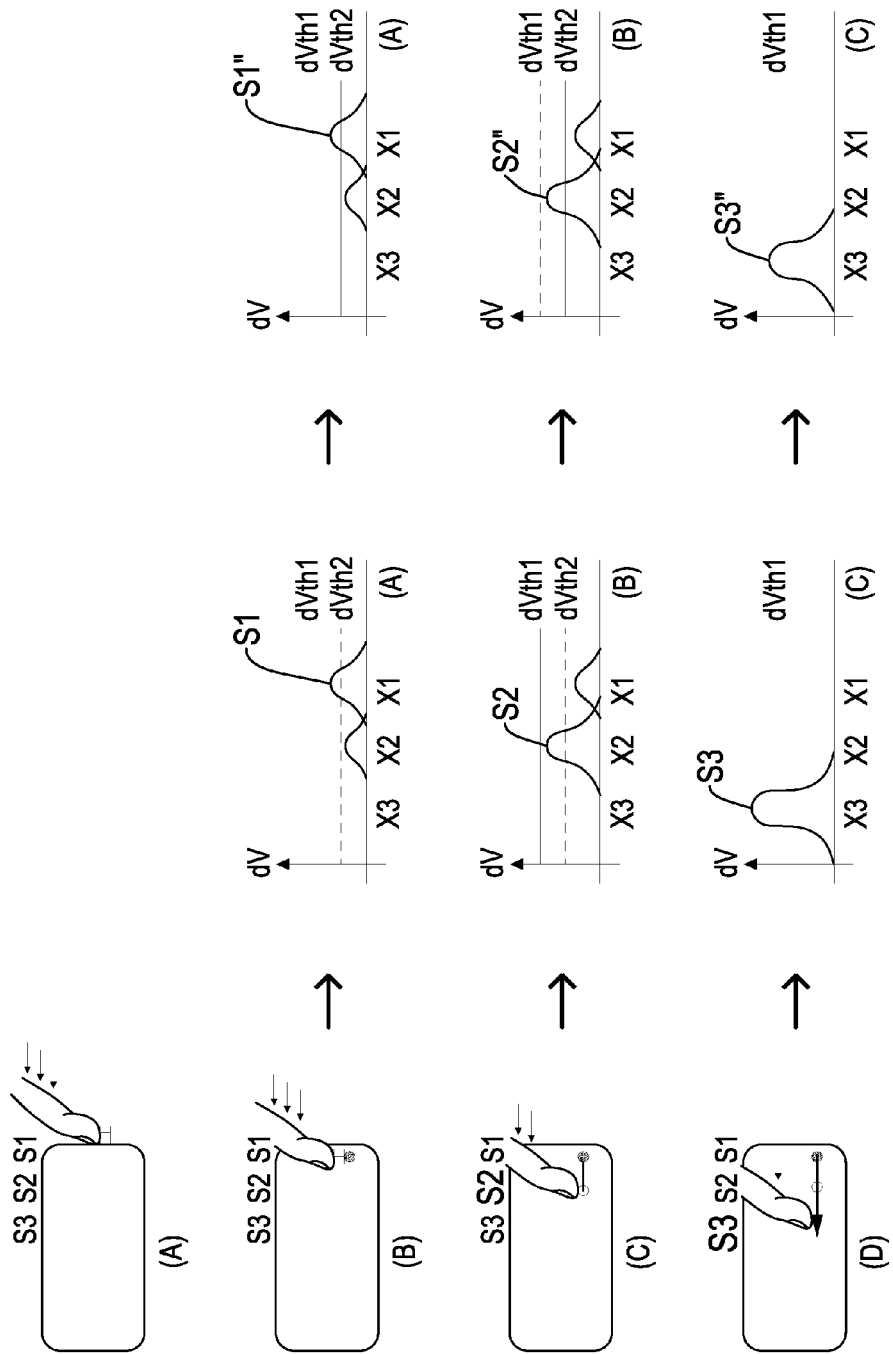

METHOD OF IDENTIFYING EDGE SWIPE GESTURE AND METHOD OF OPENING WINDOW CONTROL BAR USING THE IDENTIFYING METHOD

BACKGROUND OF THE INVENTION

1. Field of the Invention

The present invention relates to a method of identifying edge swipe gesture, and more particularly to a method of identifying edge swipe gesture and a method of opening window control bar.

2. Description of the Related Art

Touch pads or external touch pads of notebook computers serve as an alternative to a physical mouse device, and is basically equipped with functions for controlling cursor, left button and right button on the computer systems. To keep abreast of software development of manufacturers of computer systems, such touch pads start providing a control function over edge swipe gesture. For example, when computer systems initialize a hidden menu function of a window environment and users are allowed to perform the control over cursor, left button and right button, the menu bar is initially in a hidden state. Once the touch pads detect that users' gestures pertain to edge swipe gestures, the computer systems will automatically display the hidden menu bar on the screens for users to pick. Besides, functions of switching pages on screens can be supported in a similar fashion.

Microsoft® has already laid the groundwork for the rules of determining edge swipe gestures. However, due to low accuracy in determining the edge swipe gestures, the touch pads incorporating the determination rules are not handy in use. The reason is described as follows.

With reference to FIGS. 14A and 14B, based on operational habits of users, a front left portion and a front right portion of a notebook computer with respect to users are usually designed as the left button and the right button. Pressing the front left portion and the front right portion can perform the functions of the left button and the right button. As to the control over edge swipe gestures, bordering portions adjacent to the left side, the right side, and the top side of the touch pad are defined for edge swipe gestures to occur. With reference to FIG. 15, a touch device 10 capable of determining edge swipe gestures is configured with a bordering area W and a touch object-moving distance R, and a method of determining edge swipe gestures is performed under a touch mode. With reference to FIGS. 16A to 16D, when a finger moves inwards from outside the touch device 10 to firmly and sequentially touch a first sensing line to a third sensing line X1~X3 of the touch device 10, a first sensing signal to a third sensing signal S1~S3 are sequentially outputted as shown in FIG. 16E. The sensing values of the first sensing signal S1 to the third sensing signal S3 are greater than a sensing threshold dVth1 as shown in FIG. 16F. When the touch device 10 is determined by the touch mode for its sensing state, the first sensing line X1 in the bordering area W can sense the finger thereon, the finger can be sensed to sequentially move from the first sensing line to the third sensing line X1~X3 in an inward direction, and the finger is sensed to actually move a distance greater than the preset touch object-moving distance R in a period of time. Accordingly, the rules of determining edge swipe gestures are met, and the movement of the finger is determined as an edge swipe gesture.

With reference to FIG. 14, the foregoing touch device 10 is combined with a case 20 of a notebook computer. If a top surface of the touch device 10 is not flush with a top surface of the case 20 and a finger swipes from the case 20 to the right side of the touch device 10 as shown in FIGS. 15, 17A and 17B, the finger is not firmly pressing the sensing lines when the finger is on the first sensing line X1 until the finger is on the second sensing line X2 and the third sensing line X3 as shown in FIGS. 17C and 17D. With reference to FIG. 17F, although the first sensing line X1 outputs a first sensing signal S1 having a non-zero sensing value, the sensing value of the first sensing signal S1 is lower than the sensing threshold dVth1 in the touch mode. As there is no touch object identified to be on the bordering area, the rules of determining edge swipe gestures are not satisfied and no edge swipe gesture can be identified. Similar situation takes place when an area of a finger touching the bordering area is small. Since the sensing value of the first sensing signal S1 outputted from the first sensing line X1 is lower than the sensing threshold dVth1, the finger's movement fails to be identified as an edge swipe gesture, and the hidden menu bar is unable to be displayed on the screen of a window environment.

SUMMARY OF THE INVENTION

In view of the technical shortcomings in the forgoing conventional method of identifying edge swipe gesture lacking sensitive identification of edge swipe gestures, the objective of the present invention is to provide a method of identifying edge swipe gesture and a method of opening window control bar with a high success rate in identifying edge swipe gesture.

To achieve the foregoing objective, the method of identifying edge swipe gesture is performed by a controller of a touch device, and has steps of:

acquiring at least one first sensing signal on an edge area of the touch device under a hover mode;

acquiring multiple second sensing signals on a non-edge area of the touch device under a touch mode;

determining if there is a touch object on the non-edge area according to the second sensing signals, and when there is a touch object on the non-edge area, determining if the touch object has previously appeared on the edge area according to the at least one first sensing signal;

determining if a displacement of the touch object within a swipe time exceeds a swipe distance when the touch object has previously appeared on the edge area; and generating a signal indicating that a movement of the touch object corresponds to an edge swipe gesture when the displacement of the touch object within the swipe time exceeds the swipe distance.

The foregoing method employs the hover mode and the touch mode to respectively acquire sensing signals on the edge area and the non-edge area of a touch pad. Each single sensing frame is generated by converting the sensing signals on the edge area and on the non-edge edge. As being sensitive to small sensing value, the hover mode is used to acutely sense a touch object, such as a finger or stylus, swiping through the edge area. When users swipe through the touch pad with the touch object from one edge of the touch pad, despite the failure of touching the edge area or small contact area with the edge area, users' swiping movement can be identified by the hover mode. After the swiping distance and time are calculated and meet the requirements of edge swipe gesture, users' edge swipe gesture can be correctly identified as an edge swipe gesture.

To achieve the foregoing objective, the method of opening window control bar through identification of edge swipe gesture is performed by a controller of a touch device, and has steps of:

acquiring at least one first sensing signal on an edge area of the touch device under a hover mode;

acquiring multiple second sensing signals on a non-edge area of the touch device under a touch mode;

determining if a valid touch of a touch object occurs on the non-edge area of the touch device according to the second sensing signals;

when the valid touch of the touch object occurs on the non-edge area, determining if a valid touch of the touch object occurs on the edge area of the touch device according to the at least one first sensing signal;

when the valid touch of the touch object occurs on the edge area, determining if a distance between the valid touches on the edge area and the non-edge area within a swipe time exceeds a swipe distance; and when the distance exceeds the swipe distance, sending out a signal to an operating system for the operating system to open a corresponding control bar.

The foregoing method employs the hover mode and the touch mode to respectively acquire sensing signals on the edge area and the non-edge area of the touch device. Being sensitive to small sensing value, the hover mode is used to accurately sense a touch object, such as a finger or stylus, swiping through the edge area so as to identify the sensed movement as a valid touch. After the swiping distance and time are calculated and meet the requirements of edge swipe gesture, users' edge swipe gesture can be correctly identified and a signal, such as a hot key signal, can then be sent to an operating system. The operating system will open a corresponding window control bar according to the signal to achieve a higher success rate for correctly opening a window control bar through the identification of edge swipe gesture.

To achieve the foregoing objective, another method of identifying edge swipe gesture is performed by a controller of a touch device, and has steps of:

acquiring at least one first sensing signal on an edge area of the touch device under a hover mode;

acquiring multiple second sensing signals on a non-edge area of the touch device under a touch mode;

determining if there is a touch object on the non-edge area according to the second sensing signals, and when there is a touch object on the non-edge area, determining if the touch object has previously appeared on the edge area according to the at least one first sensing signal; and when the touch object has previously appeared on the edge area according to the at least one first sensing signal, sequentially outputting multiple sets of coordinates of the touch object on the edge area and on the non-edge area to an operating system for the operating system to identify a swipe gesture.

Similarly, the foregoing method also employs the hover mode and the touch mode to respectively acquire sensing signals on the edge area and the non-edge area of the touch device to increase the identification rate of users' edge swipe gesture except when the touch device is used as a touch screen. After a swiping movement is identified, the coordinates of the object on the edge area and on the non-edge area are sequentially outputted to the operating system of the computer for the operating system to make final determination of edge swipe gesture.

To achieve the foregoing objective, a major technical approach is to provide a touch system for converting a user's operation command into a signal launching a window control bar through an operating system of a computer in the touch system, and the touch system has a computer, a touch device, a display and a controller.

The computer has an operating system installed thereon.

The touch device is electrically connected to the computer and has an edge area and a non-edge area.

The edge area extends inwards a distance from an edge of the touch device.

The display is electrically connected to the computer.

The controller is electrically connected to the touch device and the computer, generates a signal for launching a window control bar after a touch object hovers on the edge area of the touch device and then touches the non-edge area of the touch device, and outputs the signal to the computer for the operating system of the computer to display a window control bar on the display.

The controller of the foregoing touch system in collaboration with the touch device can fulfill the foregoing two methods of identifying edge swipe gesture and output a signal for launching window control bar to the computer after an edge swipe gesture is identified. The operating system of the computer then opens a window control bar on the display according to the signal.

Other objectives, advantages and novel features of the invention will become more apparent from the following detailed description when taken in conjunction with the accompanying drawings.

BRIEF DESCRIPTION OF THE DRAWINGS

FIGS. 10-11A to 10-11D are schematic views of finger movements associated with an edge swipe gesture on a touch device in accordance with the present invention;

FIGS. 10-12A to 10-12C are waveform diagrams of sensing signals at corresponding finger locations in FIGS. 10-11B to 10-11D;

FIGS. 10-13A to 10-13C are waveform diagrams of signal-processed sensing signals in FIGS. 10-12A to 10-12C;

FIGS. 10-21A to 10-21D are schematic views of finger movements associated with an edge swipe gesture on a touch device in accordance with the present invention;

FIGS. 10-22A to 10-22C are waveform diagrams of sensing signals at corresponding finger locations in FIGS. 10-21B to 10-21D;

FIGS. 10-23A to 10-23C are waveform diagrams of signal-processed sensing signals in FIGS. 10-22A to 10-22C;

FIG. 11 is a flow diagram of a method of opening window control bar in accordance with the present invention;

FIG. 12 is a schematic diagram showing signal conversion after outputting a control signal to an operating system in accordance with the present invention;

FIG. 13 is a schematic view of opening a window control bar on a touch device in accordance with the present invention;

FIG. 15 is a schematic view of a conventional touch pad;

FIGS. 16A to 16D are schematic views of finger movements associated with an edge swipe gesture on a conventional touch device;

FIGS. 16E to 16F are waveform diagrams of sensing signals in FIGS. 16A to 16D;

FIGS. 17A to 17D are schematic views of finger movements associated with an edge swipe gesture not touching an outmost sensing line of a conventional touch device; and FIGS. 17E to 17F are waveform diagrams of sensing signals in FIGS. 17A to 17D.

DETAILED DESCRIPTION OF THE INVENTION

The present invention targets at increasing success rate of identifying swipe gesture on a touch device and can be also applied to open window control bar for users to increase a success rate in opening window control bar. The touch devices of the present invention are applicable to touch panels or touch screens.

Figure 1A:
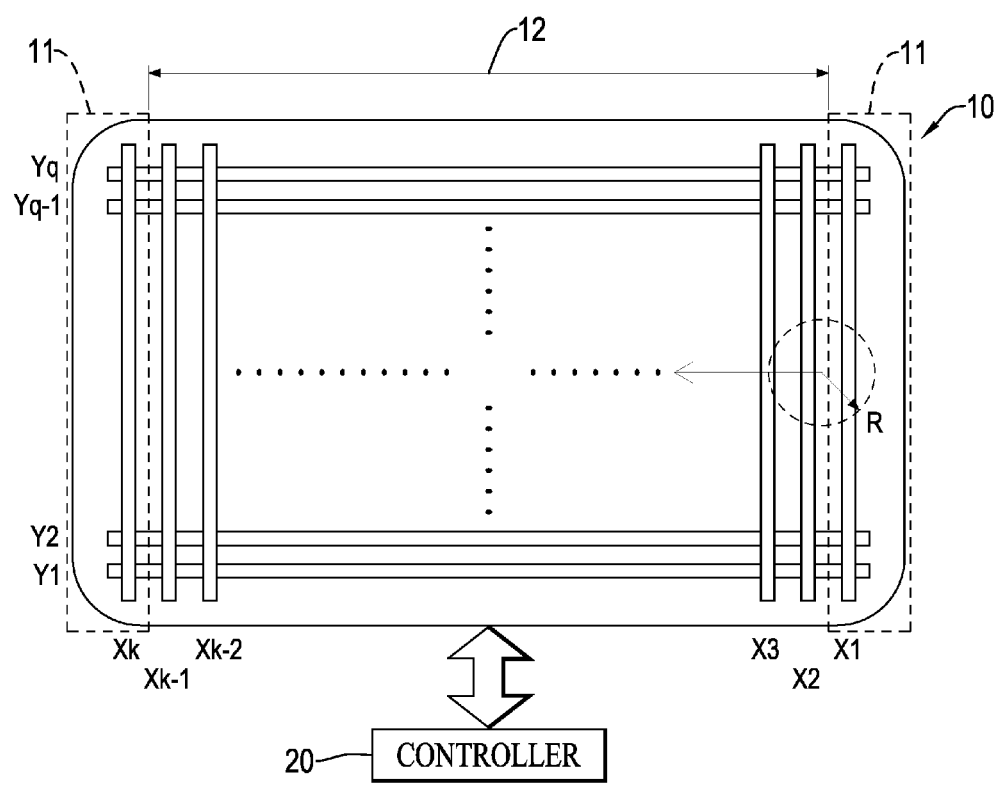
FIG. 1A is a schematic view of a first embodiment of a touch device applied to a touch pad in accordance with the present invention.
Figure 1B:
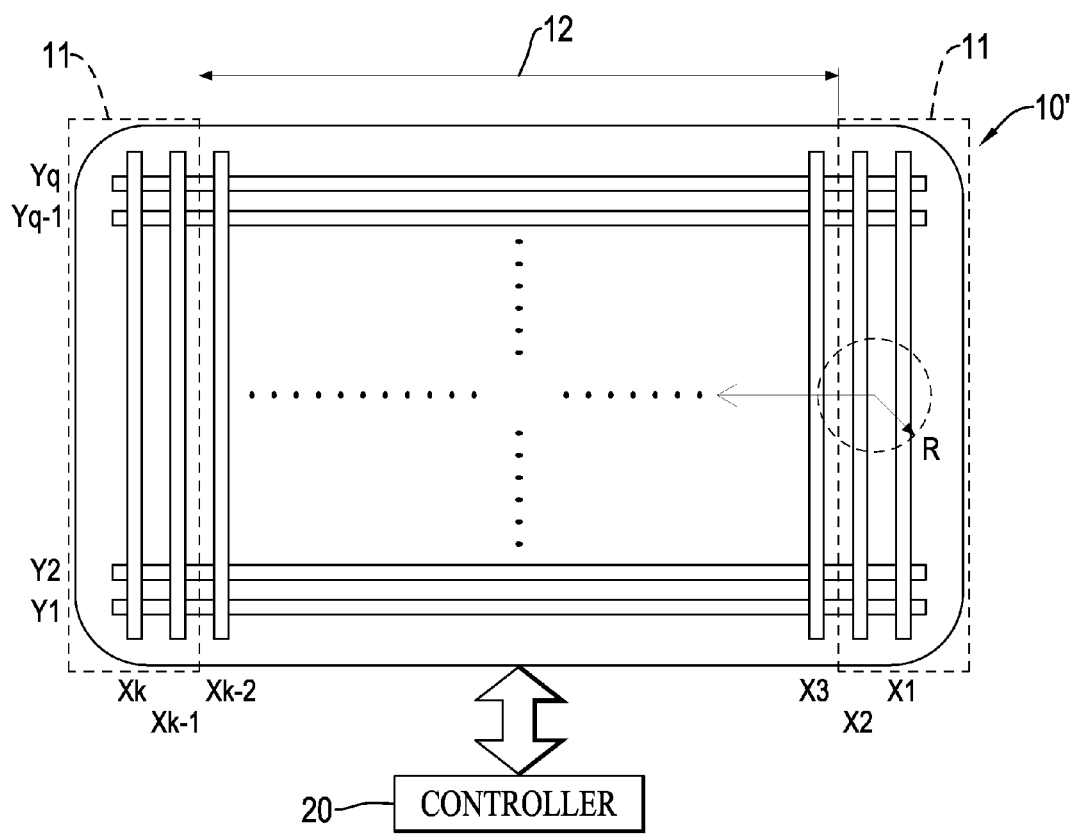
FIG. 1B is a schematic view of a second embodiment of a touch device applied to a touch pad in accordance with the present invention.

With reference to FIG. 1A, a first embodiment of a touch device 10 in accordance with the present invention has multiple sensing lines along a first axis X1~Xk, multiple sensing lines along a second axis Y1~Yq, and a controller 20 electrically connected to the sensing lines along the first axis and the second axis X1~Xk, Y1~Yq. The controller 20 drives the sensing lines along the first axis and the second axis X1~Xk, Y1~Yq by means of a self scan approach or a mutual scan approach, receives sensing signals of the sensing lines along the first axis and the second axis X1~Xk, Y1~Yq, and identifies if there is any effective touch or touch object on the touch device 10 according to the sensing signals. The touch device 10 has at least one edge area 11 and a non-edge area 12 defined on the touch device 10. The edge area 11 is defined as an area extending a distance leftwards from a right edge of the touch device 10 or extending a distance rightwards from a left edge of the touch device 10. When applied to a notebook computer, the touch device 10 further has an edge area extending a distance downwards from a top edge of the touch device 10. Each of the at least one edge area 11 contains a single sensing line X1, Xk or Yq being parallel to a nearest edge of the touch device 10. With reference to FIG. 1B, the touch device 10' has at least one edge area 11, and each of the at least one edge area 11 contains two or more than two sensing lines X1/X2, Xk−1/Xk or Yq−1/Yq being parallel to a length direction of a corresponding edge area 11. Preferably, the edge area 11 is the edge area specified by the "edge swipe gesture control functions" of WIN8™. The non-edge area 12 is defined as an area other than the at least one edge area 11 on the touch device 10, 10'.

Figure 2:
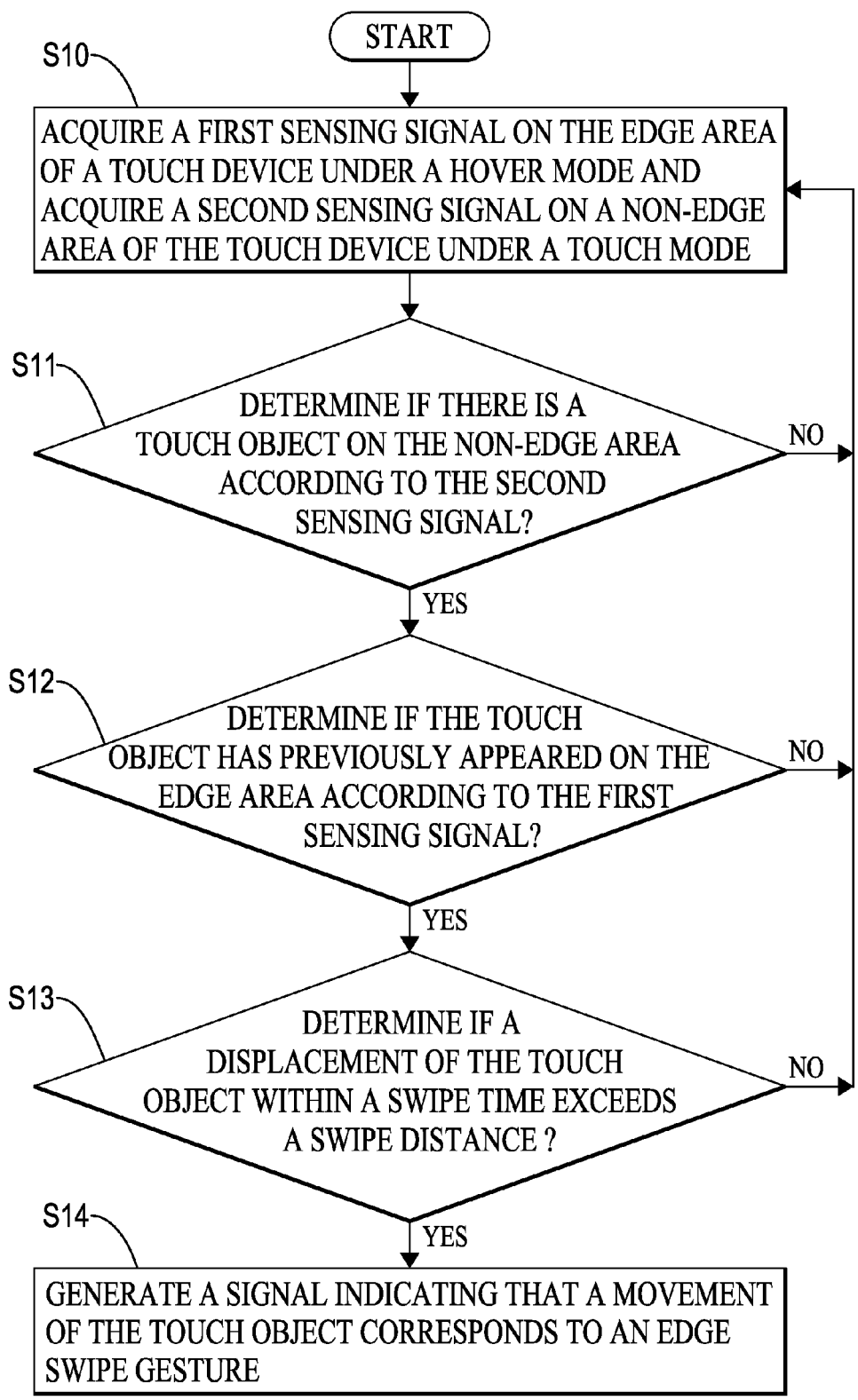
FIG. 2 is a flow diagram of a first embodiment of a method of identifying edge swipe gesture performed on the touch device in FIG. 1A.

With reference to FIG. 2, a first embodiment of a method of identifying edge swipe gesture in accordance with the present invention is performed by the controller 20 and has the following steps.

Step S10: Acquire a first sensing signal on the edge area 11 of the touch device 10 under a hover mode and acquire a second sensing signal on an entire area of the touch device 10 under a touch mode.

Step S11: Determine if there is a touch object on the non-edge area 12 according to the second sensing signal, if positive, perform step S12, and otherwise, resume step S10.

Step S12: Determine if the touch object has previously appeared on the edge area 11 according to the first sensing signal. In other words, determine if the first sensing signal has varied in response to the presence of the touch object on the edge area 11. If the determination result of step S12 is positive, perform step S13. Otherwise, resume step S10.

Step S13: Determine if a displacement of the touch object within a swipe time exceeds a swipe distance. In other words, determine if a distance between two positions of the touch object on the edge area 11 and on the non-edge area 12 exceeds the swipe distance within the swipe time. Preferably, the swipe time and the swiping distance meet the specifications of the "edge swipe gesture control functions" in WIN8™. If the determination result of step S13 is positive, perform step S14. Otherwise, resume step S10.

Step S14: Generate a signal indicating that the movement of the touch object corresponds to an edge swipe gesture.

Figure 3A:
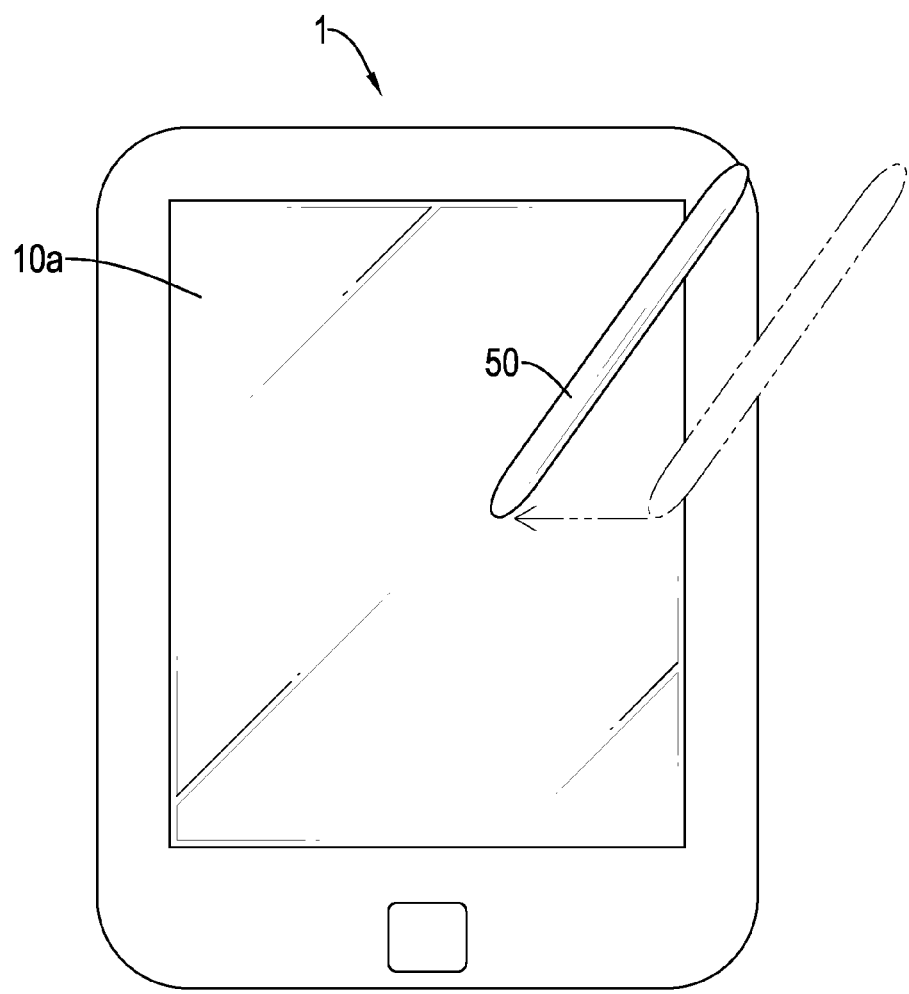
FIG. 3A is a schematic view of a touch screen to which the touch devices in FIGS. 1A and 1B are applied.
Figure 3B:
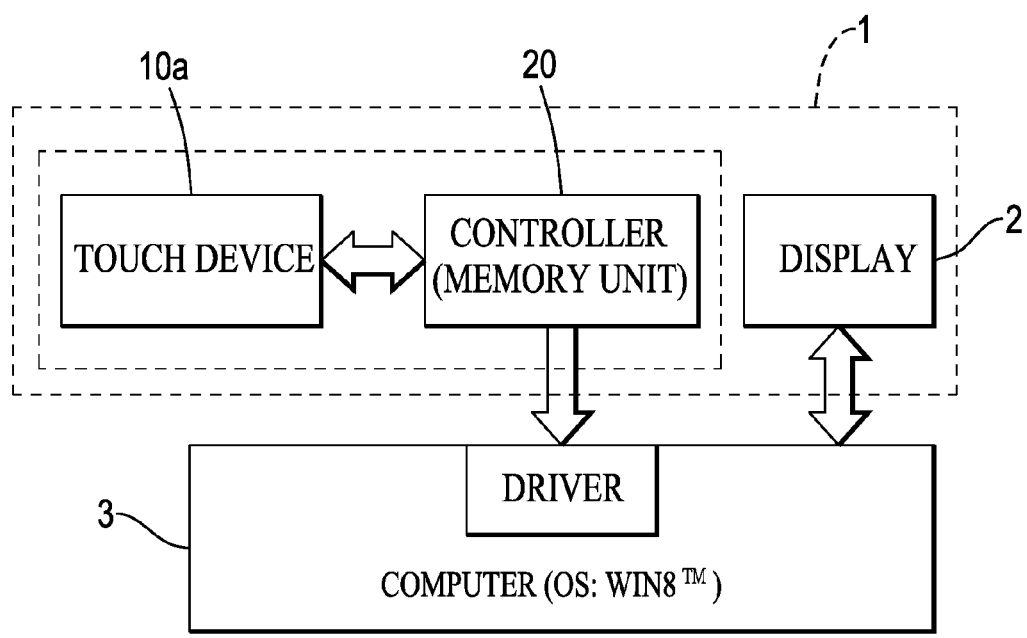
FIG. 3B is a functional block diagram of the touch screen in FIG. 3A.
Figure 4A:
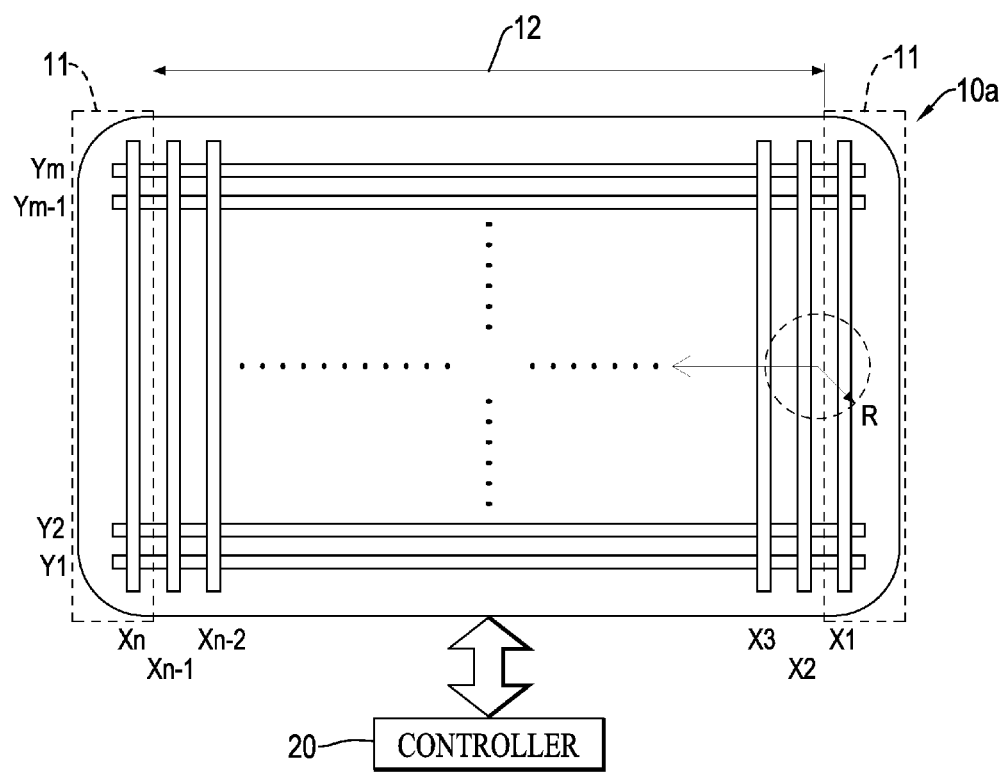
FIG. 4A is a schematic view of a first embodiment of a touch device with a touch screen in accordance with the present invention.
Figure 4B:
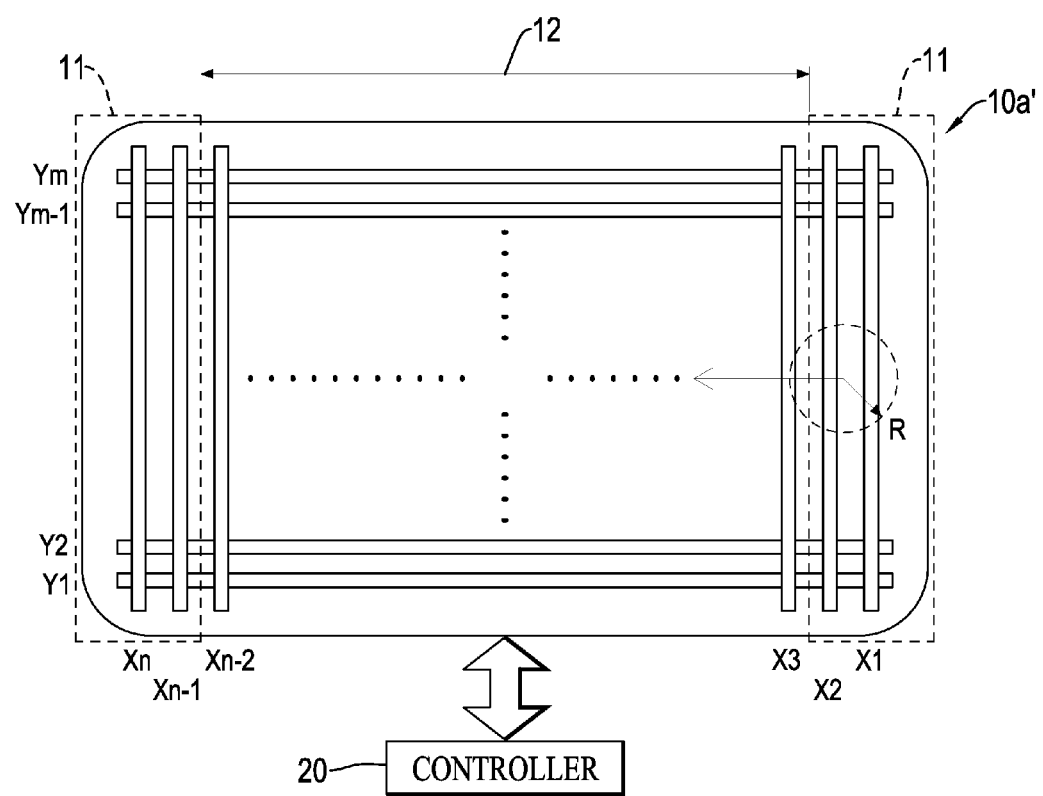
FIG. 4B is a schematic view of a second embodiment of a touch device with a touch screen in accordance with the present invention.

With reference to FIG. 3A, a touch device 10a is a touch screen 1. With reference to FIG. 3B, the touch screen 1 has a display 2. The touch device 10a is electrically connected to a controller 20. The controller 20 is electrically connected to the display 2 of the touch screen 1 through a computer 3. With reference to FIG. 4A, the touch device 10a has multiple sensing lines along a first axis and a second axis X1~Xn, Y1~Ym and a controller electrically connected to the sensing lines along the first axis and the second axis X1~Xn, Y1~Ym. The controller 20 drives the sensing lines along the first axis and the second axis X1~Xn, Y1~Ym by means of a self scan approach or a mutual scan approach, receives sensing signals of the sensing lines along the first axis and the second axis X1~Xn, Y1~Ym, and identifies if there is any touch object on the touch device 10a according to the sensing signals. Each of the at least one edge area 11 contains a single sensing line X1, Xn, Y1 or Ym being parallel to a nearest edge of the touch device 10. With reference to FIG. 4B, the touch device 10a' has at least one edge area 11, and each of the at least one edge area 11 contains two or more than two sensing lines X1/X2, Xn−1/Xn or Y1/Y2 being parallel to a length direction of a corresponding edge area 11.

Figure 5:
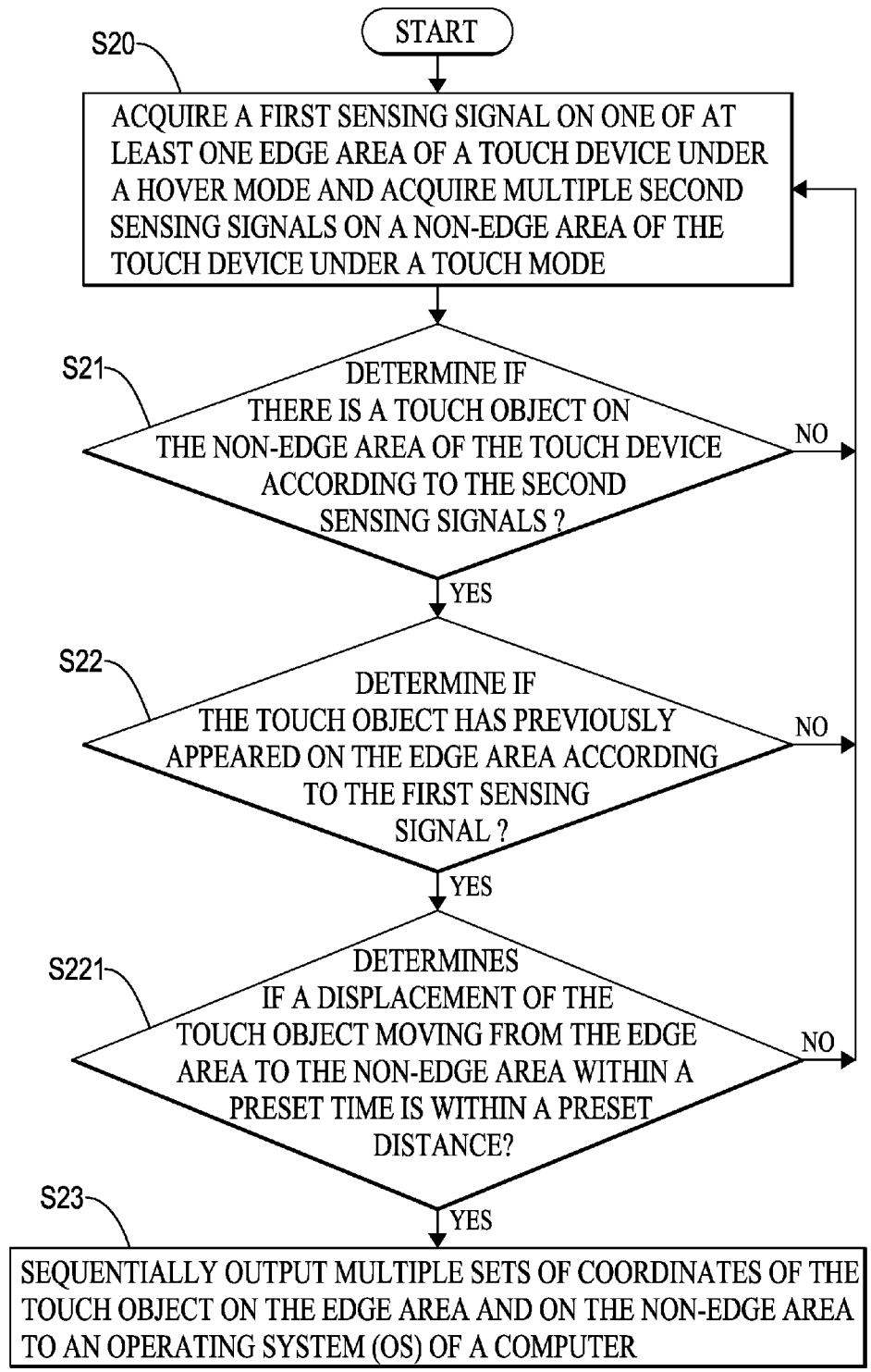
FIG. 5 is a flow diagram of a second embodiment of a method of identifying edge swipe gesture performed on the touch screen of the touch device in FIG. 4A.

With reference to FIG. 5, a second embodiment of a method of identifying edge swipe gesture in accordance with the present invention is performed by the controller 20 and has the following steps.

Step S20: Acquire at least one first sensing signal on the edge area 11 of the touch device 10a under a hover mode and acquire multiple second sensing signals on an entire area 12 of the touch device 10a under a touch mode.

Step S21: Determine if there is a touch object on the non-edge area 12 of the touch device 10a according to the second sensing signals, if positive, perform step S22, and otherwise, resume step S20.

Step S22: Determine if the touch object has previously appeared on the edge area 11 according to the first sensing signal. In other words, determine if any touch object was present on the edge area 11 according to the first sensing signal. If the determination result of step S22 is positive, perform step S23. Otherwise, resume step S20.

Step S23: Sequentially output multiple sets of coordinates of the touch object on the edge area 11 and on the non-edge area 12 to the operating system (OS) of the computer 3 for the OS to identify a swipe gesture.

Moreover, to increase the accuracy of the OS in identifying a swipe gesture, the controller 20 can further perform a step S221 after step S22 to set up a preset time that is not greater than the swipe time and a preset distance that is not greater than the swipe distance. When determining the touch object has appeared on both the edge area 11 and the non-edge area 12 in step S21, the controller 20 further determines if a displacement of the touch object moving from the edge area 11 to the non-edge area 12 within the preset time is within the preset distance. If the determination result is positive, it indicates that a swipe gesture may be identified, and the controller 20 further performs step S22. If the determination result is negative, the controller 20 only outputs the current set of coordinates of the touch object on the non-edge area 12 to the computer 3. To determine whether the displacement is within the preset distance, the controller 20 takes the first set of coordinates of the touch object on the non-edge area 12 and the any set of coordinates of the touch object or the last set of coordinates of the touch object on the edge area 11 to calculate the displacement, and compares the displacement with the preset distance to determine if the displacement is within the preset distance in step S221. Step S221 aims to eliminate the gesture using two fingers to respectively tap the edge area 11 and the non-edge area 12 in a sequential manner to enhance the accuracy in identifying a swipe gesture. Step 23 serves to sequentially output the coordinates of the touch object according to the time sequence when the touch object moves from the edge area 11 to the non-edge area 12. As sequentially receiving the coordinates of the touch object when the touch object moves from the edge area 11 to the non-edge area 12, the OS of the computer 3 can determine if the displacement of the touch object moving from the edge area 11 to the non-edge area 12 within the swipe time has exceeded a swipe distance within a swipe time, in which the swipe time and the swipe distance are specified in the "edge swipe gesture control functions" in WIN8™. If the displacement has exceeded the swipe distance within the swipe time, it indicates that current user's gesture is a swipe gesture.

To sum up, when users' swipe movement approaches the edge area 11, instead of immediately receiving the coordinates of the touch object on the edge area 11 transmitted from the controller 20, the OS of the computer 3 receives coordinates of the touch object on the edge area 11 only after the controller 20 identifies the presence of the object on the non-edge area 12, thereby effectively enhancing the correctness of the computer in identifying swipe gesture. As the involved processing time is rather short, users will not actually feel the time delay arising from the processing.

Figure 6A:
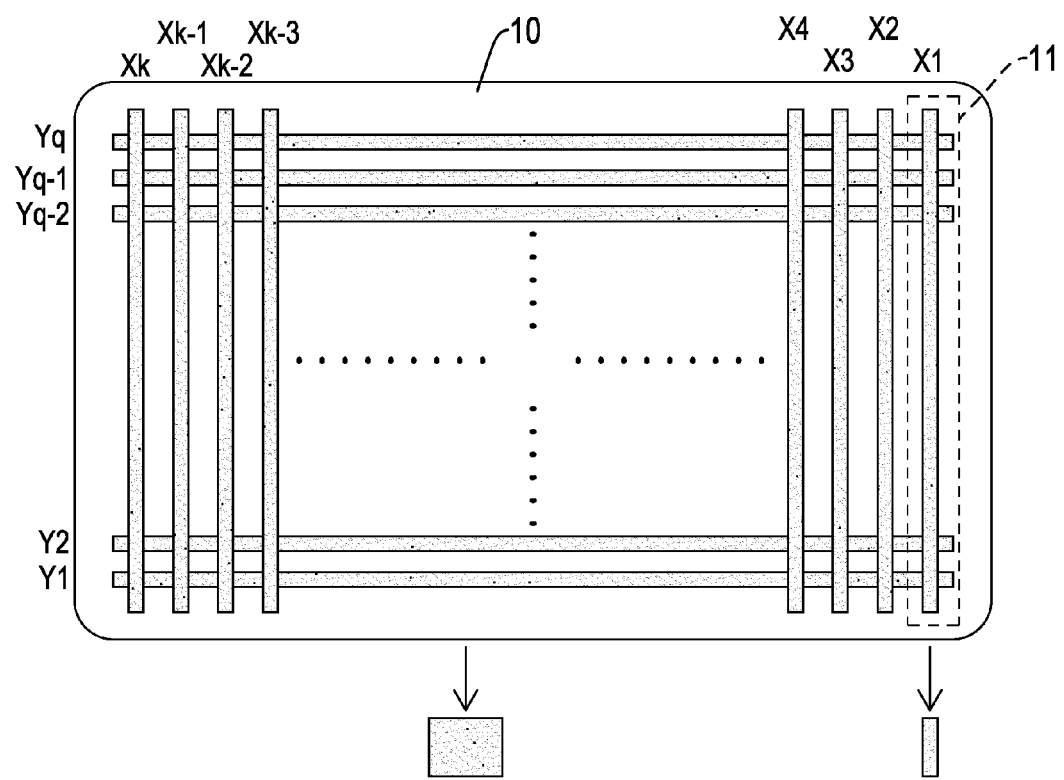
FIGS. 6A and 6B are schematic views showing generation of an effective sensing frame in accordance with the present invention.
Figure 6B:
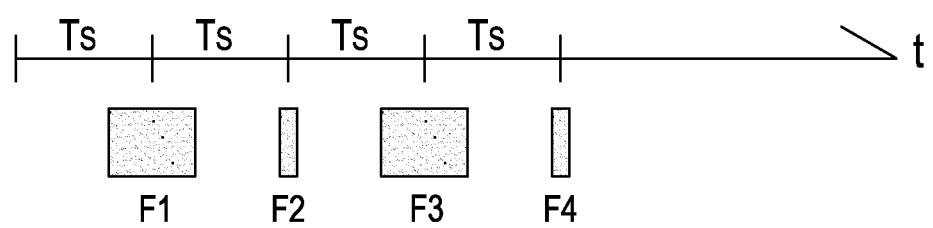

With reference to FIGS. 1A, 4A, 6A and 6B, the controller 20 of the touch device 10, 10' scans the sensing lines along the first axis and the second axis X1~Xn, Y1~Ym using a scan cycle Ts to sequentially generate sensing frames F1~F4. The controller 20 may process sensing signals under a hover mode and a touch mode. With reference to FIG. 6B, the sensing frame F1 is obtained by processing the sensing signals over the entire area of the touch device 10, 10' under the touch mode, and the sensing frame F2 is obtained by processing the sensing signals over the edge area 11 of the touch device 10, 10' under the hover mode. The following description explains how to implement the different hover mode and touch mode.

Figure 7A:
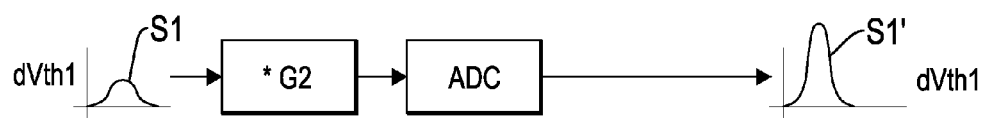
FIG. 7A is a schematic diagram showing a process of a first signal processed on an edge area of a touch panel in accordance with the present invention.
Figure 7B:
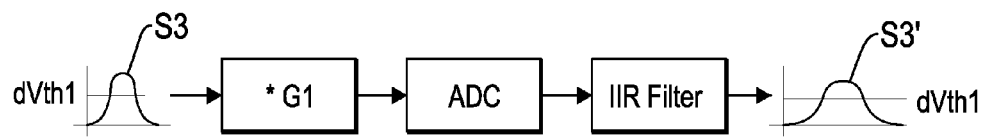
FIG. 7B is a schematic diagram showing a process of a first signal processed on a non-edge area of a touch panel in accordance with the present invention.

With reference to FIGS. 7A and 7B, a first implementation of the touch mode and the hover mode is shown. During a step of reading the first sensing signal on the edge area 11 of the touch device 10, 10' under the hover mode, the controller 20 reads the sensing signals on the edge area 11 of the touch device 10, 10' detected within each scan cycle Ts as illustrated in 1A and 3A to read the sensing signal S1 of the rightmost sensing line X1. With further reference to FIG. 7A, each sensing signal S1 of the sensing line X1 on the edge area 11 is multiplied by a hover sensitivity parameter G2. Each sensing signal after the multiplication is converted by a digital conversion into the first sensing signal S1' in generation of the sensing frames F2, F4 in FIG. 6B.

As to the step of reading the second sensing signal over the entire area of the touch device 10, 10' under the touch mode, with reference to FIG. 7B, the controller 20 reads the sensing signals on the entire area of the touch device 10, 10' detected within each scan cycle Ts, multiplies each sensing signal S3 by a touch sensitivity parameter G1, converts the sensing signal after the multiplication with an analog-to-digital conversion (ADC), and filters the sensing signal after the ADC through a digital filter, such as IIR (Infinite Impulse Response) filter. The controller 20 further computes a standard deviation or a mean by referring to previous one or previous few sensing frames with the entire area of the touch device scanned, so as to obtain the second sensing signal S3'. As the hover sensitivity parameter is greater than the touch sensitivity parameter (G2>G1), the sensing signals on the edge area 11 are amplified.

When swiping through one edge of the touch device 10, 10', a user's finger is able to approach but fails to touch the sensing line X1 on the edge area 11 due to the height difference at the edge of the touch device 10, 10'. Hence, the sensing signal sensed at the sensing line X1 is relatively weaker and is lower than a touch sensing threshold dVth1. However, after the signal processing step as shown in FIG. 7A under the hover mode, the sensing signal S1 is amplified with gain enhancement to become the first sensing signal S1'. Therefore, during the step of determining if the touch object has appeared on the edge area by means of the first sensing signal S1', the first sensing signal S1' sensed within the edge area 11 can be directly determined if it is greater than the touch sensing threshold dVth1. If the first sensing signal S1' is greater than the touch sensing threshold dVth1, the touch object is identified to have appeared within the edge area 11. As to the touch object identification on the non-edge area 12, the second sensing signal S3' is similarly compared with the touch sensing threshold dVth1. If the second sensing signal S3' is also greater than the touch sensing threshold dVth1, the touch object is identified to be present on the touch device.

Figure 8A:
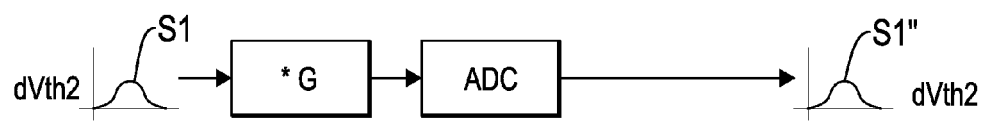
FIG. 8A is a schematic diagram showing a process of a second signal processed on an edge area of a touch panel in accordance with the present invention.
Figure 8B:
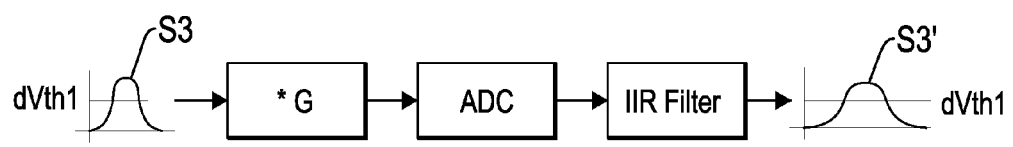
FIG. 8B is a schematic diagram showing a process of a second signal processed on a non-edge area of a touch device in accordance with the present invention.

With reference to FIGS. 8A and 8B, a second implementation of the touch mode and the hover mode is shown. During the step of reading the first sensing signal S1″ on the edge area 11 of the touch device 10, 10' under the hover mode, the sensing signal S1 read on the sensing line X1 of the edge area 11 is multiplied by a sensitivity parameter G. The sensing signal after the multiplication is converted into the first sensing signal S1″ by an analog-to-digital conversion. Each sensing signal on the non-edge area of the touch device 10, 10' sensed under the touch mode is also multiplied by the sensitivity parameter G. The sensing signal after the multiplication is converted by an analog-to-digital conversion (ADC). The sensing signal after the ADC is filtered by a digital filter, such as an IIR filter. The controller 20 further computes a standard deviation or a mean by referring to previous one or previous few sensing frames with the entire area of the touch device scanned, so as to obtain the second sensing signal S3'. It is noted from FIGS. 8A and 8B that the sensing values of the sensing signals filtered by the digital filter slightly drop. To successfully identify the weaker first sensing signal S1", the controller 20 in FIGS. 1A and 3A will set up a first sensing threshold (same as the touch sensing threshold dVth1) and a second sensing threshold (dVth2). The second sensing threshold is less than the first sensing threshold (dVth2<dVth1). As long as the first sensing signal S1" is greater than the second sensing threshold, the first sensing signal S1" can still be considered to be valid.

Figure 9:
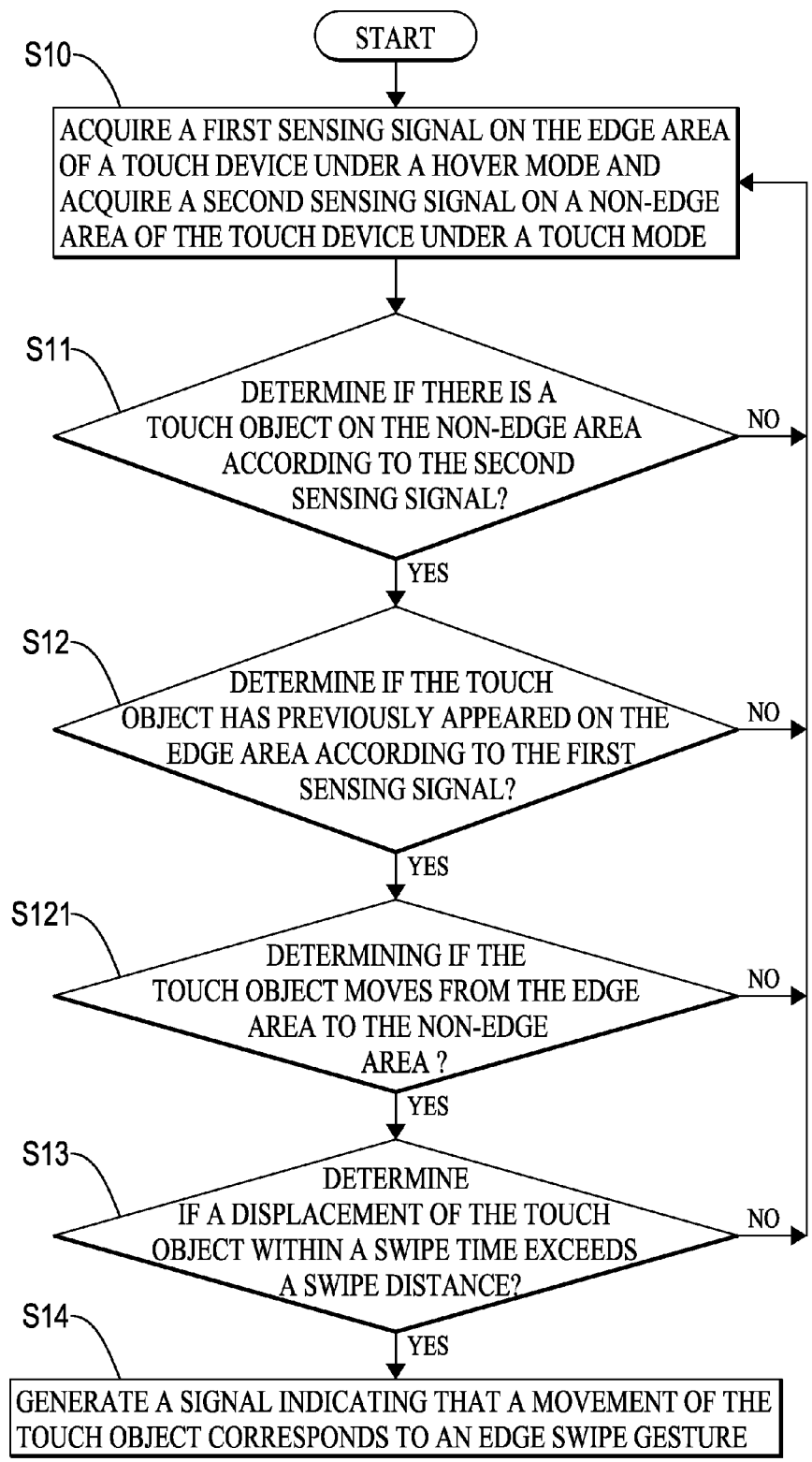
FIG. 9 is a flow diagram of a third embodiment of a method of identifying edge swipe gesture performed on the touch device in FIG. 1B.

With reference to FIG. 9, a third embodiment of a method of identifying edge swipe gesture in accordance with the present invention is substantially the same as the method illustrated in FIG. 2, and adopts a first implementation of combining the touch mode and the hover mode as illustrated in FIGS. 10-11D, 10-12C and 10-13C. When the sensing signal S3' on the non-edge area of the touch device has been signal-processed and is determined that its sensing value has exceeded the touch sensing threshold dVth1, the controller 20 identifies the touch object present on the non-edge area of the touch device and further determines if the touch object is present on the edge area according to previous two sensing frames. The present embodiment is performed on the touch device in FIG. 1B. Hence, a step S121 of determining if the touch object moves from the edge area 11 to the non-edge area 12 is additionally included in the step S12. In other words, the moving direction of the touch object is determined by the variations of the first sensing signals S1', S2' on the two sensing lines X1, X2 on the edge area 11 according to the previously-generated first sensing frame and second sensing frame. Specifically, the finger-moving direction is illustrated in FIGS. 10-11A to 10-11D. With reference to FIGS. 10-11B and 10-11C, when the finger swipes through but does not touch the edge area 11, the sensing signals of the sensing lines X1, X2 are illustrated in FIGS. 10-12A and 10-12B. Before undergoing the gain-enhancing signal processing, both sensing values of the sensing signals S1 of the sensing line X1 in the consecutive two scanning results do not exceed the touch sensing threshold dVth1. Both the sensing values of the first sensing signals S1 and the second sensing signal S2 on the sensing lines X1, X2 in the consecutive first and second sensing frames, which are illustrated in FIGS. 10-13A and 10-13B and generated after the gain-enhancing signal processing, exceed the touch sensing threshold dVth1. Subsequently, the moving direction of the touch object is to be determined. As the sensing value of the first sensing signal S1' on the sensing line X1 is greater than the sensing value of the first sensing signal S2' on the sensing line X2 as illustrated in FIG. 10-13A in the first sensing frame and the sensing value of the first sensing signal S1' on the sensing line X1 is less than the sensing value of the first sensing signal S2' on the sensing line X2 as illustrated in FIG. 10-13B in the second sensing frame, the touch object is determined to move from the edge area 11 to the non-edge area 12.

An second implementation of combining the touch mode and the hover mode can be employed to determine if any touch object is present on the edge area. Similarly, as illustrated in FIGS. 10-21D, 10-22C and 10-23C, determining if a touch object is present on the edge area of the touch device takes place after determining that the touch object is identified on the non-edge area according to the sensing signal S3". With reference to FIGS. 10-21B and 10-21C, when a finger swipes through but does not touch the edge area 11 due to the height difference at the edge of the touch device, the sensing signals of the sensing lines X1, X2 are illustrated as in FIGS. 10-22A and 10-22B. In the consecutive first and second sensing frames generated after the signal processing in the hover mode as illustrated in FIGS. 10-23A and 10-23B, although not being greater than the first sensing threshold dVth1, the sensing values of the first sensing signals S1", S2" already exceed the second sensing threshold dVth2. Subsequently, the moving direction of the touch object is to be determined. As the sensing value of the first sensing signal S1" on the sensing line X1 is greater than the sensing value of the first sensing signal S2" on the sensing line X2 as illustrated in FIG. 10-23A in the first sensing frame and the sensing value of the first sensing signal S1" on the sensing line X1 is less than the sensing value of the first sensing signal S2" on the sensing line X2 as illustrated in FIG. 10-23B in the second sensing frame, the touch object is determined to move from the edge area 11 to the non-edge area 12.

The edge area on the touch device 10a' applied to the touch screen 1 in FIG. 4B has two or more than two sensing lines. Hence, step S121 in FIG. 9 can be added between steps S22 and S221 in FIG. 5 to determine if the touch object moves from the edge area to the non-edge area, and step S221 is performed only after the determination result in step 121 is positive.

Figure 11:
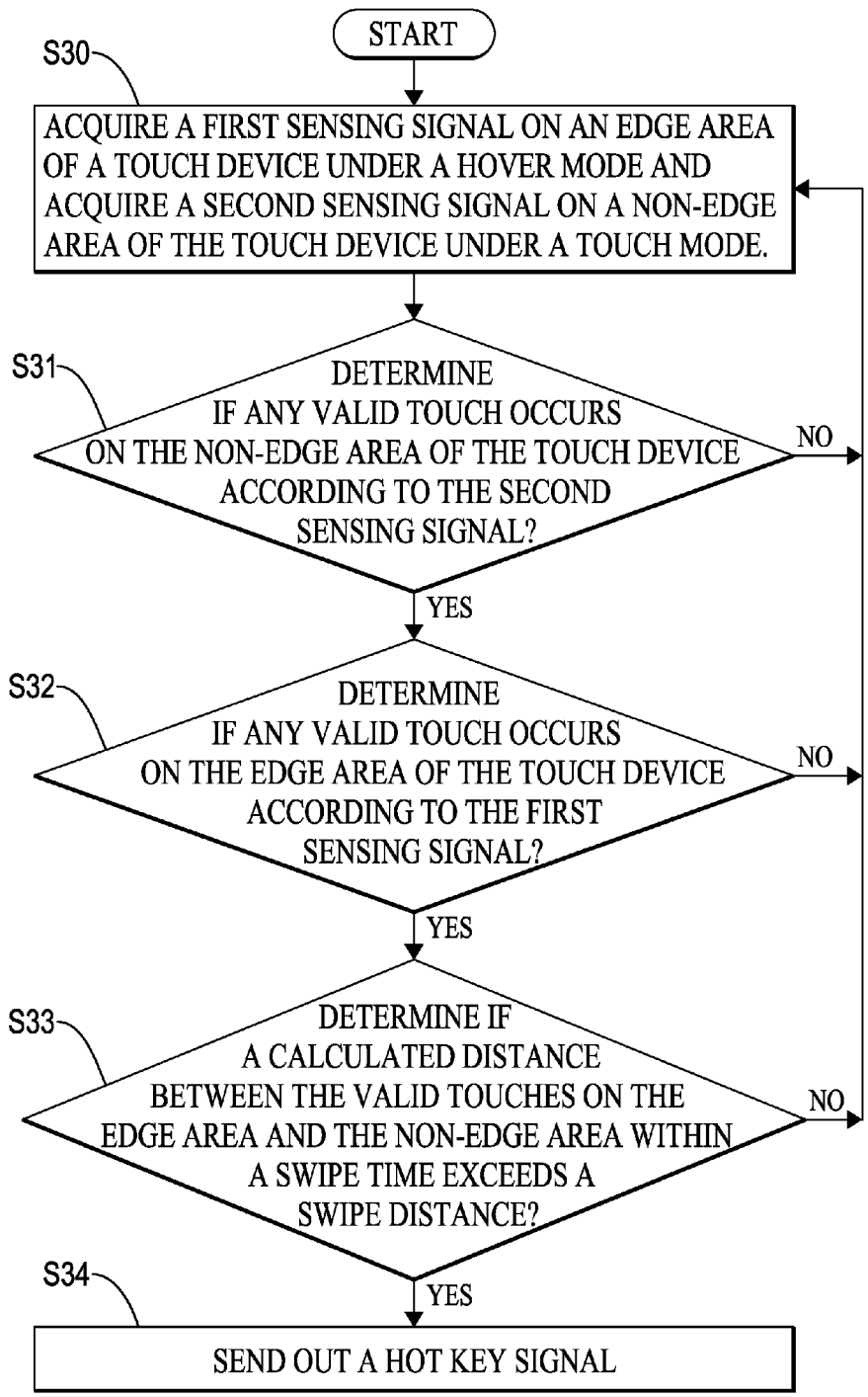

The foregoing methods of identifying edge swipe gesture employ the hover mode and the touch mode to perform signal processing on the sensing signals on the edge area 11 and the non-edge area 12 of the touch device 10, 10' so as to facilitate swipe gesture determination and increase the success rate in identifying edge swipe gesture by means of touch information detected under the hover mode. Such technique is also applicable to a method of opening window control bar. With reference to FIG. 11, the method of opening window control bar has the following steps.

Step S30: Acquire a first sensing signal on an edge area 11 of the touch device 10, 10' under a hover mode and acquire a second sensing signal on an entire area of the touch device 10, 10' under a touch mode.

Step S31: Determine if any valid touch occurs on the non-edge area 12 of the touch device 10, 10' according to the second sensing signal. If the determination result is positive, perform step S32. Otherwise, resume step S30.

Step S32: Determine if any valid touch occurs on the edge area 11 of the touch device 10, 10' according to the first sensing signal. If the determination result is positive, perform step S33. Otherwise, resume step S30.

Step S33: Determine if a calculated distance between the valid touches on the edge area 11 and the non-edge area 12 within a swipe time exceeds a swipe distance. If the determination result is positive, perform step S34. Otherwise, resume step S30. In a preferred implementation of the step 33, a distance between an initial position of one of the valid touches on the edge area and a last position of another valid touch on the touch device is calculated, and the distance is determined if exceeding the swipe distance.

Step S34: Send out a hot key signal. The hot key signal is sent to an OS for the OS to open a corresponding window control bar. Additionally, a step of determining the valid touch moves from the edge area 11 to the non-edge area 12 can be added.

Figure 12:
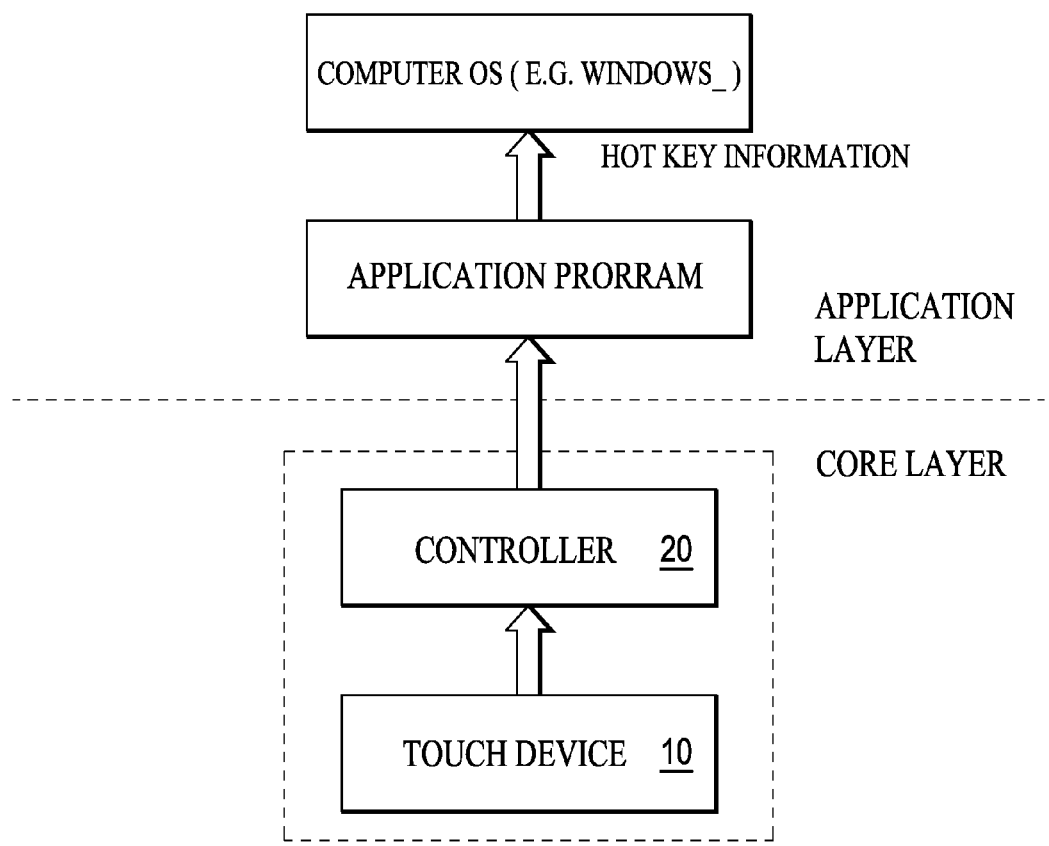
Figure 13:
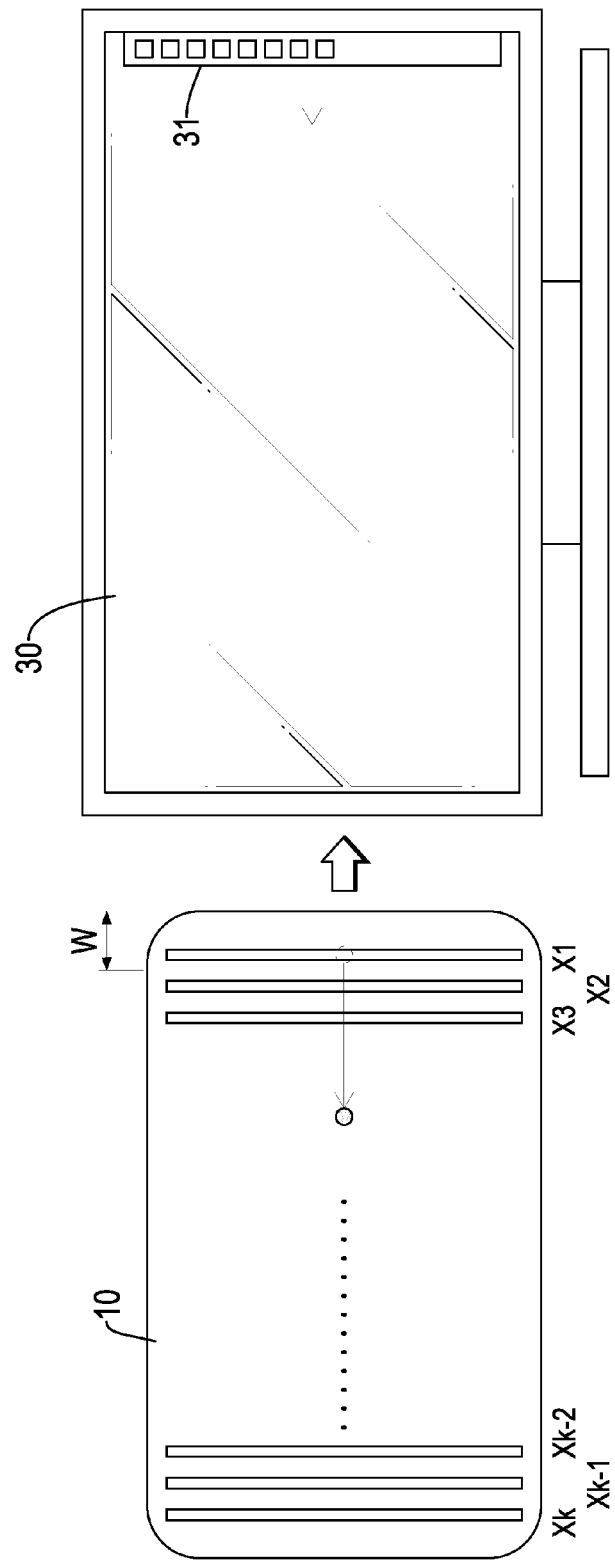
Figure 14A:
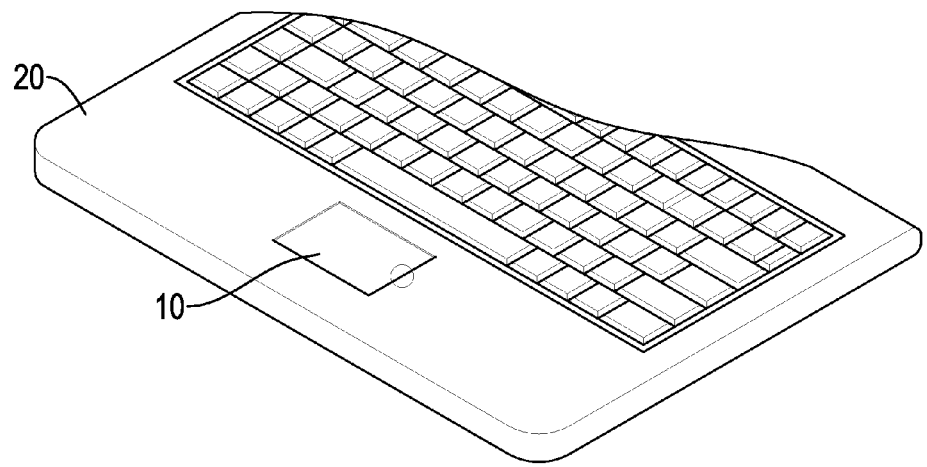
FIG. 14A is a schematic view of a conventional touch pad mounted on a housing of a notebook computer.
Figure 14B:
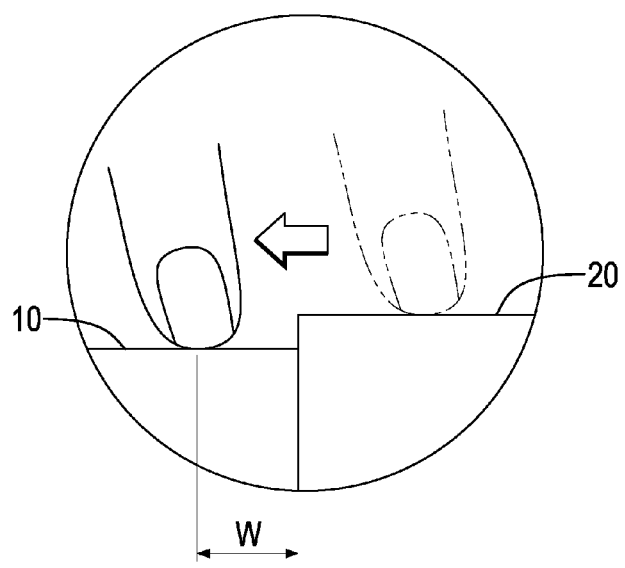
FIG. 14B is a partially enlarged operational schematic view of the conventional touch pad in FIG. 14A.
Figure 15:
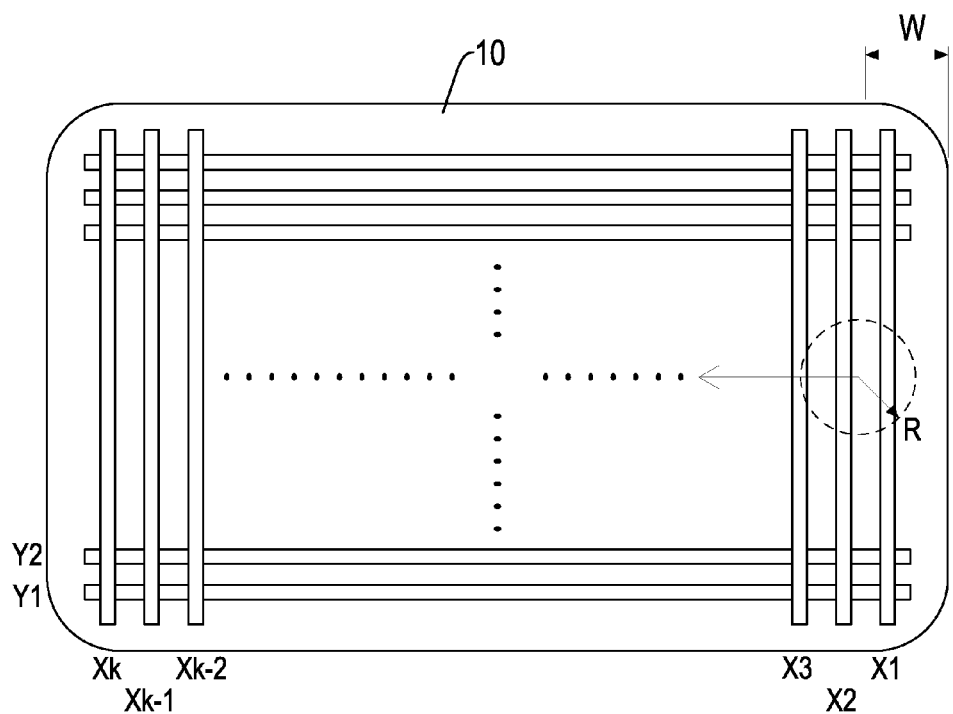
Figure 16:
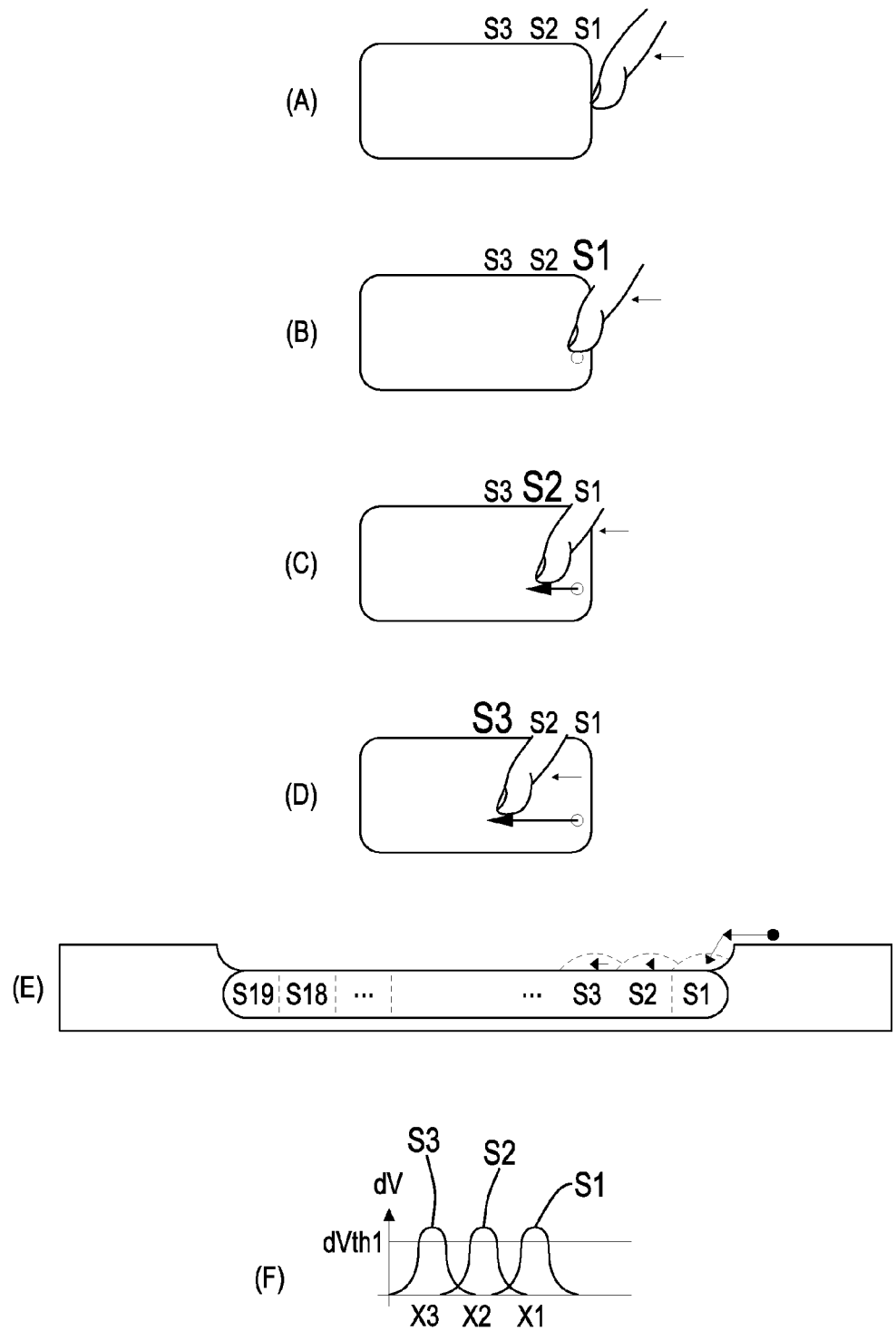
Figure 17:
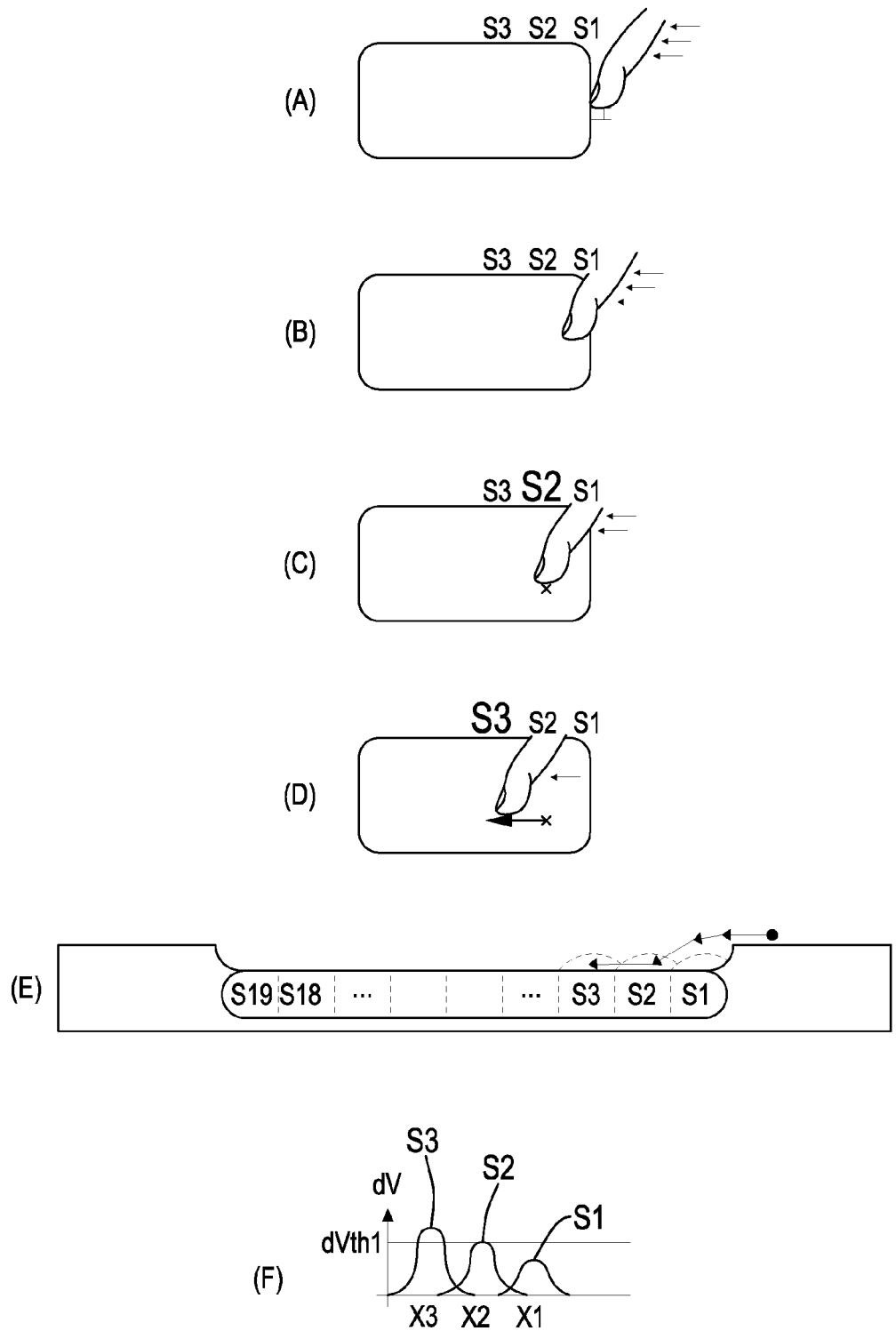

To fulfill the foregoing steps, with reference to FIG. 12, the controller 20 of the touch device 10, 10' performs steps S20-S23 in a kernel layer therein, and outputs the coordinates (X, Y) of the valid touches to an application program operated on the highest application layer (user interface) for the application program to determine if an edge swipe gesture is identified according to the coordinates of the valid touches. When an edge swipe gesture is identified, the controller 20 generates a hot key signal corresponding to the edge swipe gesture and sends the hot key signal to the user interface of WIN8™. After receiving the hot key signal, a computer with WIN8™ installed thereon performs a function corresponding to the hot key signal. An example is illustrated in FIG. 13. When users make a left swipe from the right edge of the touch panel, once the swipe movement is successfully identified, the controller 20 of the touch device 10, 10' in FIG. 1A or 1B outputs a signal to an application. After identifying the swipe movement as an edge swipe gesture, the application outputs a hot key signal specified by WIN8™, which is equivalent to the hot key signal generated by simultaneously pressing the "WINDOWS" key and the "C" key on a standard keyboard, for the OS to receive the hot key signal. The computer then controls to display a window control bar 31 on a right edge of a screen 30 of a display. If the application identifies that the swipe movement is an edge swipe gesture moving from left to right so as to open the window control bar 31 on a left edge of the screen 30, the application then outputs a hot key signal specified by WIN8™, which is equivalent to the hot key signal generated by simultaneously pressing the "WINDOWS" key and the "Tab" key on a standard keyboard. If the application identifies that the swipe movement is an edge swipe gesture moving from top to bottom so as to open the window control bar 31 on a top edge of the screen 30, the application then outputs a hot key signal specified by WIN8™, which is equivalent to the hot key signal generated by simultaneously pressing the "WINDOWS" key and the "Z" key on a standard keyboard. The foregoing description includes, but is not limited to, a feasible approach of identifying edge swipe gesture and opening window control bar.

In sum, the present invention respectively reads the sensing signals on the edge area and on the non-edge area of the touch device using the hover mode and the touch mode, determines if the signal-processed first sensing signal has varied after determining that a valid touch occurs on the non-edge area, and determines that a valid touch has already occurred on the edge area before the valid touch occurring on the non-edge area if the first sensing signal has varied so as to identify an edge swipe gesture. As the hover mode can sense weak sensing value of the sensing signals, using the hover mode in the present invention can sense the finger or stylus swiping through the edge area with higher degree of dexterity so as to easily identify a valid touch. Once the calculations of the swipe distance and swipe time meet the requirements of an edge swipe gesture, the present invention can correctly identify users' swiping movement and send a hot key signal to an OS for the OS to open a corresponding control bar, thereby increasing the success rate in identifying edge swipe gesture and opening a control bar.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method of identifying edge swipe gesture performed by a controller of a touch device, the method comprising steps of:
   acquiring at least one first sensing signal on an edge area of the touch device under a hover mode;
   acquiring multiple second sensing signals on an entire area of the touch device under a touch mode;
   determining if there is a touch object on the non-edge area according to the second sensing signals, and when there is a touch object on the non-edge area, determining if the touch object has previously appeared on the edge area according to the at least one first sensing signal;
   determining if a displacement of the touch object within a swipe time exceeds a swipe distance when the touch object has previously appeared on the edge area; and
   generating a signal indicating that a movement of the touch object corresponds to an edge swipe gesture when the displacement of the touch object within the swipe time exceeds the swipe distance.

2. The method as claimed in claim 1, wherein
   the edge area has at least one sensing line; and
   the step of acquiring the at least one first sensing signal under the hover mode has steps of:
     multiplying a sensing signal of each of the at least one sensing line on the edge area by a hover sensitivity parameter; and
     converting the sensing signal after the multiplication into one of the at least one first sensing signal.

3. The method as claimed in claim 2, wherein the step of determining if the touch object has previously appeared on the edge area has steps of:
   determining if a sensing value of any one of the at least one first sensing signal on the edge area within a previous sensing frame is greater than a touch sensing threshold; and
   determining that the touch object has previously appeared on the edge area when the sensing value of the first sensing signal on the edge area within the previous sensing frame is greater than the touch sensing threshold.

4. The method as claimed in claim 3, wherein
   the edge area has multiple sensing lines; and
   the step of determining if the sensing value of any one of the at least one first sensing signal on the edge area is greater than the touch sensing threshold has a step of when the sensing value of the first sensing signal of at least one of the sensing lines on the edge area is greater than the touch sensing threshold, comparing variations of the first sensing signals of the sensing lines on the edge area within a first sensing frame and a second sensing frame previously read to determine a moving direction of the touch object, wherein the first sensing frame is read earlier than the second sensing frame.

5. The method as claimed in claim 4, wherein
   the multiple sensing lines of the edge area include a first sensing line and a second sensing line; and
   in the step of comparing variations of the first sensing signals, when the sensing value of the first sensing signal of the first sensing line is greater than the sensing value of the first sensing signal of the second sensing line within the first sensing frame and the sensing value of the first sensing signal of the first sensing line is less than the sensing value of the first sensing signal of the second sensing line within the second sensing frame, determining that the touch object moves from the edge area to the non-edge area, wherein the first sensing line is located between an edge of the touch device and the second sensing line.

6. The method as claimed in claim 2, wherein
   the entire area has multiple sensing lines; and the step of acquiring the second sensing signals on the non-edge area of the touch device under the touch mode has steps of:
  reading multiple sensing signals of the sensing lines on the entire area;
  multiplying the sensing signal of each sensing line on the non-edge area with a touch sensitivity parameter and converting the sensing signal after the multiplication by an analog-to-digital conversion (ADC), wherein the touch sensitivity parameter is less than the hover sensitivity parameter; and
  filtering the sensing signal on the entire area after the ADC to obtain a corresponding second sensing signals.

7. The method as claimed in claim 6, wherein the step of determining if there is a touch object on the non-edge area according to the second sensing signals further has a step of determining if a sensing value of any second sensing signal is greater than the touch sensing threshold, and if the sensing value of any second sensing signal is greater than the touch sensing threshold, determining that the touch object is identified on the non-edge area.

8. The method as claimed in claim 1, wherein
the edge area has at least one sensing line; and
the step of acquiring the at least one first sensing signal on the edge area of the touch device under the hover mode has steps of:
  multiplying a sensing value of a sensing signal of each of the at least one sensing line on the edge area by a sensitivity parameter; and
  converting the sensing signal of the sensing line on the edge area after the multiplication into a corresponding first sensing signal through an ADC.

9. The method as claimed in claim 8, wherein
the entire area has multiple sensing lines; and
the step of acquiring multiple second sensing signals on the entire area of the touch device under the touch mode has steps of:
  reading a sensing signal of each sensing line on the entire area;
  multiplying a sensing value of the sensing signal of each sensing line on the entire area by the sensitivity parameter and converting the sensing signal of the sensing line on the entire area after the multiplication through the ADC; and
  filtering the sensing signal on the entire area after the ADC to obtain a corresponding second sensing signal.

10. The method as claimed in claim 9, wherein
the step of determining if the touch object has previously appeared on the edge area according to the at least one first sensing signal has steps of:
  determining if a sensing value of any one of the at least one first sensing signal within the edge area in a previous sensing frame is greater than a second sensing threshold; and
  when the sensing value of the first sensing signal in the previous sensing frame is greater than the second sensing threshold, determining that the touch object has previously appeared on the edge area; and
the step of determining if there is a touch object on the non-edge area according to the second sensing signals has steps of:
  determining if a sensing value of any second sensing signal is greater than a first sensing threshold, wherein the first sensing threshold is greater than the second sensing threshold; and
  when the sensing value of the second sensing signal is greater than the first sensing threshold, determining that the touch object is identified on the non-edge area.

11. The method as claimed in claim 1, wherein one of the at least one sensing line of the edge area is parallel to a length direction of the edge area.

12. The method as claimed in claim 2, wherein one of the at least one sensing line of the edge area is parallel to a length direction of the edge area.

13. The method as claimed in claim 3, wherein one of the at least one sensing line of the edge area is parallel to a length direction of the edge area.

14. The method as claimed in claim 4, wherein the multiple sensing lines of the edge area are parallel to a length direction of the edge area.

15. The method as claimed in claim 5, wherein the multiple sensing lines of the edge area are parallel to a length direction of the edge area.

16. A method of identifying edge swipe gesture performed by a controller of a touch device, the method comprising steps of:
  acquiring at least one first sensing signal on an edge area of the touch device under a hover mode;
  acquiring multiple second sensing signals on an entire area of the touch device under a touch mode;
  determining if there is a touch object on a non-edge area according to the second sensing signals, and when there is a touch object on the non-edge area, determining if the touch object has previously appeared on the edge area according to the at least one first sensing signal; and
  when the touch object has previously appeared on the edge area according to the at least one first sensing signal, sequentially outputting multiple sets of coordinates of the touch object on the edge area and on the non-edge area to an operating system for the operating system to identify a swipe gesture.

17. The method as claimed in claim 16, wherein the step of determining if the touch object has previously appeared on the edge area has a step of determining if a displacement of the touch object moving from the edge area to the non-edge area within a preset time falls within a range of a preset distance when determining that the touch object has previously appeared on the edge area.

18. The method as claimed in claim 17, wherein the displacement is defined between a first set of coordinates of the touch object on the non-edge area and any set of coordinates of the touch object on the edge area.

19. The method as claimed in claim 17, wherein the displacement is defined between the first set of coordinates of the touch object on the non-edge area and a last set of coordinates of the touch object on the edge area.

20. The method as claimed in claim 18, further comprising steps of:
  determining if a displacement of the touch object moving from the edge area to the non-edge area within a swipe time exceeds a swipe distance after the operating system sequentially receives the multiple sets of coordinates of the touch object; and
  if the displacement within the swipe time exceeds the swipe distance, determining that an edge swipe gesture is identified;
  wherein the preset time is not greater than the swipe time and the preset distance is not greater than the swipe distance.

21. The method as claimed in claim 16, wherein
the edge area has at least one sensing line; and the step of acquiring the at least one first sensing signal under the hover mode has steps of:
    multiplying a sensing signal of each of the at least one sensing line on the edge area by a hover sensitivity parameter; and
    converting the sensing signal after the multiplication into one of the at least one first sensing signal.

22. The method as claimed in claim 21, wherein the step of determining if the touch object has previously appeared on the edge area has steps of:
    determining if a sensing value of any one of the at least one first sensing signal on the edge area within a previous sensing frame is greater than a touch sensing threshold; and
    determining that the touch object has previously appeared on the edge area when the sensing value of the first sensing signal on the edge area within the previous sensing frame is greater than the touch sensing threshold.

23. The method as claimed in claim 22, wherein
the edge area has multiple sensing lines; and
the step of determining if the sensing value of any one of the at least one first sensing signal on the edge area is greater than a touch sensing threshold has a step of when the sensing value of the first sensing signal of at least one of the sensing lines on the edge area is greater than the touch sensing threshold, comparing variations of the first sensing signals of the sensing lines on the edge area within a first sensing frame and a second sensing frame previously read to determine a moving direction of the touch object, wherein the first sensing frame is read earlier than the second sensing frame.

24. The method as claimed in claim 23, wherein
the multiple sensing lines of the edge area include a first sensing line and a second sensing line; and
in the step of comparing variations of the first sensing signals, when the sensing value of the first sensing signal of the first sensing line is greater than the sensing value of the first sensing signal of the second sensing line within the first sensing frame and the sensing value of the first sensing signal of the first sensing line is less than the sensing value of the first sensing signal of the second sensing line within the second sensing frame, determining that the touch object moves from the edge area to the non-edge area, wherein the first sensing line is located between an edge of the touch device and the second sensing line.

25. The method as claimed in claim 24, wherein
the non-edge area has multiple sensing lines; and
the step of acquiring the second sensing signals on the non-edge area of the touch device under the touch mode has steps of:
    reading multiple sensing signals of the sensing lines on the non-edge area;
    multiplying the sensing signal of each sensing line on the non-edge area with a touch sensitivity parameter and converting the sensing signal after the multiplication by an analog-to-digital conversion (ADC), wherein the touch sensitivity parameter is less than the hover sensitivity parameter; and
    filtering the sensing signal after the ADC to obtain one of the second sensing signals.

26. The method as claimed in claim 25, wherein the step of determining if there is a touch object on the non-edge area according to the second sensing signals further has a step of determining if a sensing value of any second sensing signal is greater than the touch sensing threshold, and if the sensing value of any second sensing signal is greater than the touch sensing threshold, determining that the touch object is identified on the non-edge area.

27. The method as claimed in claim 20, wherein
the edge area has at least one sensing line; and
the step of acquiring the at least one first sensing signal under the hover mode has steps of:
    multiplying a sensing signal of each of the at least one sensing line on the edge area by a sensitivity parameter; and
    converting the sensing signal after the multiplication into one of the at least one first sensing signal.

28. The method as claimed in claim 27, wherein
the non-edge area has multiple sensing lines; and
the step of acquiring the second sensing signals on the non-edge area of the touch device under the touch mode has steps of:
    reading multiple sensing signals of the sensing lines on the non-edge area;
    multiplying the sensing signal of each sensing line on the non-edge area with the sensitivity parameter and converting the sensing signal after the multiplication by an ADC; and
    filtering the sensing signal after the ADC to obtain one of the second sensing signals.

29. The method as claimed in claim 28, wherein the step of determining if there is a touch object on the non-edge area according to the second sensing signals has steps of:
    determining if a sensing value of any second sensing signal is greater than a first sensing threshold; and
    when the sensing value of the second sensing signal is greater than the first sensing threshold, determining that the touch object is identified on the non-edge area;
    wherein the first sensing threshold is greater than the second sensing threshold.

30. A touch system of opening window control bar through edge swipe gesture, comprising:
    a computer having an operating system installed thereon;
    a touch device electrically connected to the computer and having:
        an edge area extending inwards a distance from an edge of the touch device; and
        a non-edge area;
    a display electrically connected to the computer; and
    a controller electrically connected to the touch device and the computer, generating a signal for launching a window control bar after an edge swipe gesture is identified, and outputting the signal to the computer for the operating system of the computer to display a window control bar on the display, wherein the controller has following steps to identify the edge swipe gesture:
    acquiring at least one first sensing signal on the edge area of the touch device under a hover mode;
    acquiring multiple second sensing signals on the an entire area of the touch device under a touch mode;
    determining if there is a touch object on an non-edge area according to the second sensing signals, and when there is the touch object on the non-edge area, determining if the touch object has previously appeared on the edge area according to the at least one first sensing signal; and
    when the touch object has previously appeared on the edge area according to the at least one first sensing signal, the edge swipe gesture being identified.

31. A method of identifying edge swipe gesture, comprising steps of:

scanning a touch device under a hover mode to acquire hover information of an edge area of the touch device; and scanning the touch device under a touch mode to determine if a touch object has touched a non-edge area of the touch device under the touch mode;

when there is the touch object on the non-edge area, determining if the hover information, which is previously acquired under the hover mode, includes touch object information; and when the hover information includes the touch object information, generating a signal indicating that a movement of the touch object corresponds to an edge swipe gesture.

32. The method as claimed in claim 31, wherein the signal is a hot key signal.

* * * * *